US006226656B1

(12) United States Patent
Zawadzki et al.

(10) Patent No.: US 6,226,656 B1
(45) Date of Patent: May 1, 2001

(54) SYSTEM AND METHOD FOR CREATING, GENERATING AND PROCESSING USER-DEFINED GENERIC SPECS

(75) Inventors: Jan C. Zawadzki, Carlsbad; Christopher E. Dornsife, Poway; Edward F. Ross, Carlsbad, all of CA (US)

(73) Assignee: SourceFinder, Inc., San Diego, CA (US)

( * ) Notice: Subject to any disclaimer, the term of this patent is extended or adjusted under 35 U.S.C. 154(b) by 0 days.

(21) Appl. No.: 09/191,467

(22) Filed: Nov. 12, 1998

(51) Int. Cl.[7] .................................................. G06F 17/30

(52) U.S. Cl. ......................... 707/506; 707/10; 707/102

(58) Field of Search ................................ 707/506, 507, 707/102, 10

(56) References Cited

U.S. PATENT DOCUMENTS

| | | | |
|---|---|---|---|
| 4,839,829 | 6/1989 | Freedman | 364/519 |
| 5,367,619 | * 11/1994 | Dipaolo et al. | 707/506 |
| 5,694,551 | * 12/1997 | Doyle et al. | 705/26 |
| 5,745,712 | * 4/1998 | Turpin et al. | 345/333 |
| 5,758,126 | 5/1998 | Daniels et al. | 395/500 |
| 5,911,141 | * 6/1999 | Kelley et al. | 707/10 |
| 5,963,939 | * 10/1999 | McCann et al. | 707/4 |

FOREIGN PATENT DOCUMENTS

| | | |
|---|---|---|
| 778 535 A2 | 6/1997 | (EP) . |
| 2 234 896 | 11/1998 | (GB) . |
| 97/27555 | 7/1997 | (WO) . |

OTHER PUBLICATIONS

Aberdeen Group Review: "NovaSoft," Aberdeen Group Review, 'Online!—Jul. 1, 1997, XP002090204, Retrieved from the Internet: <URL:Available on–line in 1997>.

(List continued on next page.)

Primary Examiner—Jean R. Homere
(74) Attorney, Agent, or Firm—Lyon & Lyon LLP

(57) ABSTRACT

An automated system and method for defining, creating, presenting, completing and processing generic specs. A spec server is coupled with a data base management system. The spec server having a content editor, a page builder, a content reader, a rule processor, a template generator and a compatibility engine. An industry expert creates a domain tree having information associated with a particular domain. Each domain tree includes questions, options and rules pertaining the generation of specs in the domain. The content editor is used to create, modify and maintain the domain trees. Once a domain tree is constructed, the industry expert uses the content editor to define a plurality of components. Components are constructed by selecting a subset of the domain tree in accordance with the requirements of the associated component. This subset is referred to as a component tree. A spec template is created for each product spec. Spec templates are created by defining the components of the spec. Components can be defined as optional or required by specifying a minimum and maximum number for each component. Optional components are selectively included by users completing the spec. Users access the spec server via the Internet. The page builder dynamically builds custom pages and presents them to users via a web browser. The content of the web pages depends on previous answers and selections from the user. A rule processor interprets rules defined by the industry expert and sets flags used by the page builder to turn on or turn off certain options presented to the user. The compatibility engine compares completed specs with one another to find specs that are compatible. The template generator uses additional rules supplied by the industry expert to generate customized outputs.

39 Claims, 16 Drawing Sheets

OTHER PUBLICATIONS

Ciancarini, P. et al "A multi–agent process centered environment integrated with the WWW," Proceedings—The Workshop on Enabling Technologies: Infrastructure For Collaborative Enterprises, US, IEEE Computer Society Press, Los Alamitos, CA, Jan. 1, 1997, pp. 113–120 XP002090172 ISSN: 1080–1383.

Matrix One, Inc., "Matrix", Online!—1997 XP002111377, retrieved from the Internet, <URL: Available on–line on 1997>.

* cited by examiner

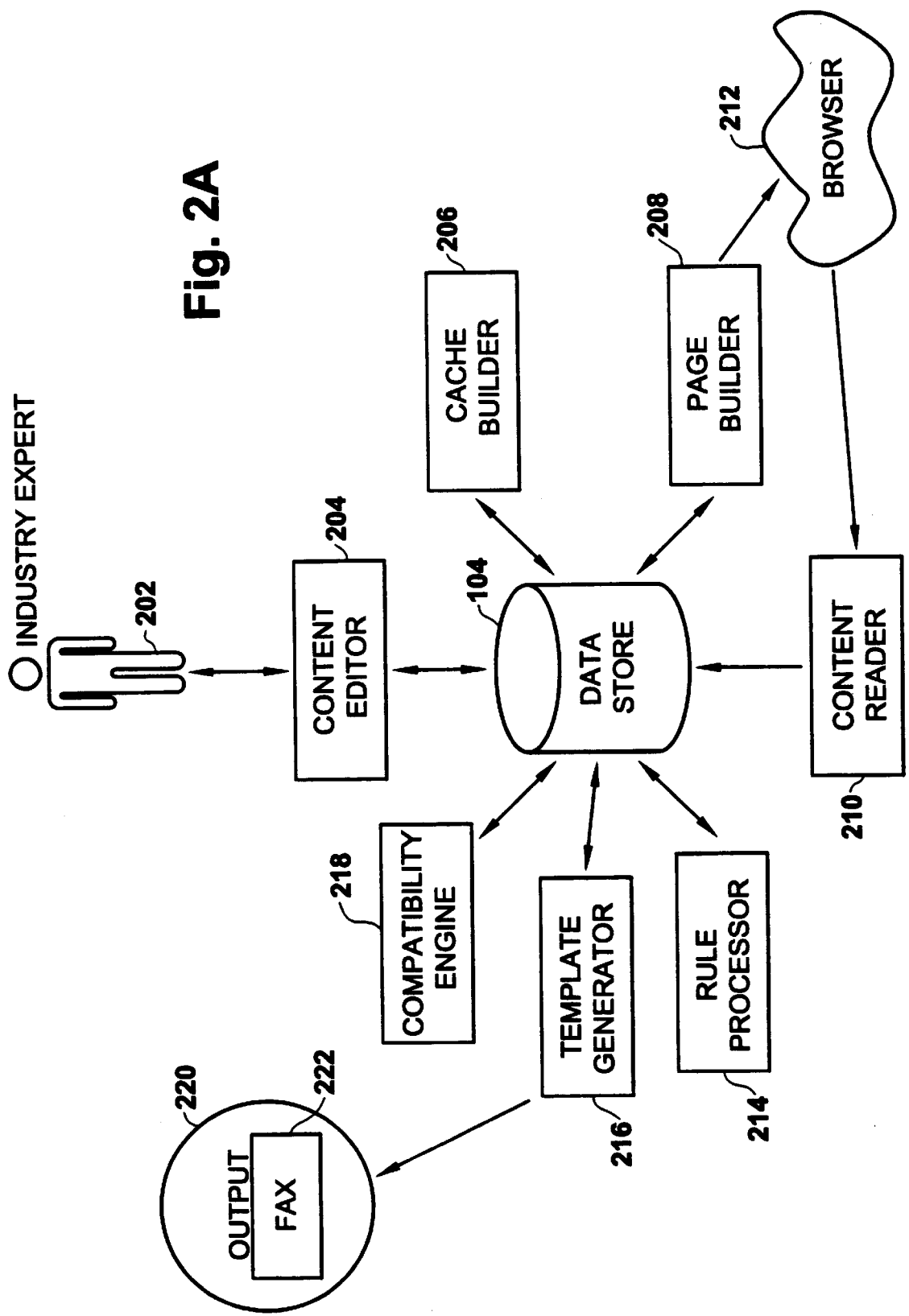

Spec Name:  [Annual Report]  *
File Under: [Form Testing-DO NOT SUBMIT RFQs] [▶]
Start Date: [        ]   End Date: [        ]
Limit Access: ☐   Add to My Page: ○ Yes  ⦿ No # of Bodies:              [3] ▶ — 419
# of Supplied Inserts:    [1] ▶ — 421
# of Dbl. Panel B/Cards Inserts: [0] ▶ — 423
# of BRC/BRM Inserts:     [1] ▶ — 425
# of Single Panel B/Cards: [0] ▶ — 427

} — 429

431 ↗
437 ↗

[OK]  [Cancel]

* Indicates Required Information

SmartSpec ID: 3991  } 702
Annual Report-Cover

704

Sheet Specs 710

Number of pages: [ 2 ] 718
Finished Size: [ Vert 8.5 X 11 ▨ ] 720
Custom Size: [ ]
Printing Method: [ Sheetfed Offset ▨ ]
Pre-press Supplied: [ Digital Text Only ▨ ] 722

Options 712

☑ Split Run 724
☐ Perforating 726
☐ Scoring
☐ Panels/Folds
☐ Glue
☐ Pockets/Flaps
☐ Foil Stamping
☐ Embossing
☐ Die Cutting
☑ Coating
☐ Drilling/Punching 728

Multiple Covers
714

Cover 1 Qty: ⬜ — 730
Cover 2 Qty: ⬜ — 732
Cover 3 Qty: ⬜
Cover 4 Qty: ⬜
Cover 5 Qty: ⬜
Cover 6 Qty: ⬜
Cover Description: ⬜ — 734

708 — Save/Continue  Save/Go To Project Mgmt

Fig. 7B

SmartSpec ID: 4064
Annual Report-Cover-Artwork —802                                          —800

Digital/Text Only —804

Transportation Media: [ Select ▼ ]  ⎫
Platform: [ Select ▼ ]              ⎬ 808
                                    ⎭

Software Supported
806                    ☐ Quark         —810
Version #: [          ]

☐ PageMaker
Version #: [          ]

☐ Frame Maker
Version #: [          ]

Fig. 8

☐ Photoshop
Version #: [          ]

☐ Illustrator
Version #: [          ]

☐ Freehand
Version #: [          ]

☐ Other Application
Name and Version #: [          ]
Output Size: [ Select ▼ ]
Other Output Size: [     ]
Proof Type: [ Select ▼ ]
Multiple Proofs Needed: [                              ]

812 — [Save/Continue]  [Save/Go To Project Mgmt]

SmartSpec ID: 4064
Annual Report-Cover-Ink — 1002 ← 1000

Side 1 — 1004
4-color Process
1008

☐ 4-Color Process
Coverage: [Select ▨]  } 1016

PMS
1010

☐ PMS
Coverage: [Select ▨]
Number of PMS Colors: [Select ▨]
PMS Color: [ ]
PMS Color: [ ]
PMS Color: [ ]
PMS Color: [ ]
PMS Color: [ ]
PMS Color: [ ]
Specialty Inks: [         ]
} 1018

Black
1012

☐ Black
Coverage: [Select ▨]  } 1020

Bleeds
1014
Number of Sides: [Select ▨] — 1022

Fig. 10A

Side 2 ⟋1006
4-color Process

☐ 4-Color Process

Coverage: [Select ▼]

PMS

☐ PMS

Coverage: [Select ▼]

Number of Colors: [Select ▼]

PMS Color: [      ]

PMS Color: [      ]

PMS Color: [      ]

PMS Color: [      ]

PMS Color: [      ]

PMS Color: [      ]

Specialty Inks: [         ▲]
               [          ]
               [         ▼]

Black

☐ Black

Coverage: [Select ▼]

Bleeds

Number of Sides: [Select ▼]

[Save/Continue]  [Save/Go To Project Mgmt]

Fig. 10B

SYSTEM AND METHOD FOR CREATING, GENERATING AND PROCESSING USER-DEFINED GENERIC SPECS

BACKGROUND OF THE INVENTION

1. Field of the Invention

The present invention relates generally to a system and method for generating specs, and more particularly to an automated system and method for defining, creating, presenting, completing and processing user-defined generic specs.

2. Related Art

The present invention is directed toward specs. Typically, specs are used by a first party to fully specify requirements (i.e. products and/or services) that are to be provided by a second party. This enables the second party, not only to provide the precise requirements as requested by the first party, but also to provide the first party with an accurate price quotation for the request.

Specs are commonly used for example, in industry. One such example is the printing industry, where many options are available for each product offered by suppliers. Customers typically complete a spec, in one form or another, to receive a price quotation from a supplier.

Conventionally, designing and creating specs is a manual process performed by industry experts, often in an ad-hoc or improvised manner. For example, sales personnel are generally quite knowledgeable about the products they sell. Thus, when a sales representative takes an order from a customer, they generally know what questions to ask, what options to offer, and what options not to offer due to incompatibilities. This ad-hoc process often becomes an iterative process, when it is often determined at a later date, that a supplier needs additional details and/or clarifications before a price quotation can be provided.

In order to avoid these problems, a more systematic approach has been taken. Pre-defined specs are often created by suppliers. These pre-defined specs are generally in the form of questionnaires that are completed by customers, sometimes with the assistance of sales reps. These questionnaires ideally include all possible options available for each product.

For example, in the printing industry, a separate questionnaire or spec is typically required for each product. Thus, if a customer desires a price quotation for an annual report, for example, the customer completes the particular pre-defined spec specifically designed for annual reports. The pre-defined spec ideally guides the customer so that all of the details necessary for each option selected are fully specified.

This conventional process is problematic on many levels. One problem is that the printing industry, like many industries, is capable of providing thousands of products to customers. Therefore, creating and maintaining separate specs for each product can be extremely time-consuming and can be prohibitively expensive.

Another problem with this conventional method is related to the required maintenance of pre-defined specs. Specs often need to be changed due to the dynamic nature of most businesses. Routine changes to business processes can often affect one or more pre-defined specs. For example, new products or processes can be introduced and/or existing products or processes can be discontinued or modified. Even worse, changing a single vendor could affect a multitude of pre-defined specs. For instance, suppose a print supplier changes the vendor that provides, for example, ink or paper. This seemingly minor change could require a modification to thousands of specs across the board.

Another problem with conventional specs from a customer's perspective, is that each company typically maintains their own proprietary specs. Thus, when customers want to shop around and receive price quotations from multiple suppliers, they typically have to complete different and separate specs for each supplier, even though the exact same product is being requested.

SUMMARY OF THE INVENTION

Accordingly, the present invention is directed toward an automated system and method for defining, creating, presenting, completing and processing user-defined generic specs.

It should be noted that the type of specs used in industry, as described above, are used in the examples herein to aid in the description of the concepts presented. It should be kept in mind however, that a "generic" spec can deal with any subject matter and is not restricted to the industry type of specs discussed in the examples below.

A feature of the present invention is that a centralized data structure referred to as a domain tree is used to generate all of the specs for a particular industry or domain. In this fashion, when changes are made to the domain tree, all of the specs created therefrom are automatically updated to reflect the changes.

Another feature of the present invention is that the specs generated therefrom can be shared among multiple suppliers. Therefore, a customer need only complete a single spec for each requirement requested. The single completed spec is then automatically transformed into requests for price quotations that are formatted and customized, if necessary, to conform to the requirements of each supplier.

An advantage of the present invention is that customers can complete specs without assistance from industry experts. Specs are completed on-line, from anywhere around the world; the only requirement being that the customer has access to the Internet.

A typical implementation of the present invention comprises a spec server and a data base management system. The spec server comprises at least the following components: a content editor, a page builder, a content reader, a rule processor, a template generator and a compatibility engine.

An industry expert creates a data structure referred to as a "domain tree." The domain tree comprises a wealth of information associated with a particular domain. A domain is the embodiment of knowledge regarding a particular subject area. Each domain tree includes questions, options and rules pertaining to a category of "products" provided by suppliers within the domain. Also included in the domain tree are instructions related to the presentation of the specs generated from the domain tree. The content editor is used to create, modify and maintain domain trees.

Once a domain tree is constructed, the industry expert uses the content editor to define a plurality of components. Components are constructed by using the content editor to select a subset of the domain tree associated with each component. This subset is referred to herein as a "component tree".

A spec template is created for each product spec. The industry expert creates a spec template by defining one or more components comprising the spec. In addition, the industry expert defines components as being either optional or required. Optional components can be selectively included in a product spec by the user completing the spec. Required components are automatically included in the product spec. In addition, the industry expert can define a maximum number of times that any component can appear within a particular spec.

An advantage of the present invention is that if changes are made to the domain tree, all of the specs created therefrom are automatically updated to reflect the changes.

Users access the spec server via a computer network, preferably the Internet. The page builder of the present invention dynamically builds custom pages that are presented on a web browser to the user. The content of the pages depends on previous answers and selections from the user. A rule processor is used to interpret rules defined by the industry expert. The rule processor is used to set flags that are used to turn on or turn off certain options displayed to the user while completing the specs.

After a spec is completed by the user, a compatibility engine compares the completed spec with other completed specs, such as specs completed by suppliers. In particular, using this example, suppliers complete specs in much the same manner as described above. The specs completed by suppliers however, describe the capabilities of the suppliers, rather than product requirements.

Thus, the compatibility engine typically compares a group of specs completed by suppliers (i.e. a group of supplier profiles), with a completed user spec and tests for compatibility. Once compatible suppliers are determined, a template generator uses additional rules supplied by the industry expert to generate requests for price quotations (RFQs). The RFQs. are then sent to the compatible suppliers.

BRIEF DESCRIPTION OF THE FIGURES

The present invention is described with reference to the accompanying drawings, wherein:

FIG. 2A is a block diagram depicting a preferred set of components that can be used to implement the spec server according to a preferred embodiment of the present invention;

FIG. 4B is an example of a spec definition page, according to a preferred embodiment of the present invention;

FIGS. 6–10B are representations of web pages that can be generated from the component tree in FIG. 4A, according to a preferred embodiment of the present invention;

DETAILED DESCRIPTION OF THE PREFERRED EMBODIMENTS

The present invention is directed toward an automated system and method for defining, creating, presenting, completing and processing user-defined generic specs. As stated, specs are devices typically used to describe in detail, some form of request, such as a request for a product or service. The specs are then read by a vendor or supplier so that they can provide the requester with an accurate price quotation for the requested product or service.

An example of an industry that uses specs is the printing industry. Specs are typically required due to the fact that many different options are available for each product. To obtain price quotations for products, customers typically complete a spec that defines in detail, the requested product. The completed spec then serves as a request for a price quotation (RFQ).

It is noted that the example of an "industry spec" is used throughout the present specification to facilitate in the detailed description presented herein. It should be kept in mind however, that the present invention is directed toward generic specs, which can deal with any type of subject matter imaginable. That is, the present invention is no way restricted to the industry type of specs used as examples described herein. Accordingly, the examples used herein are for exemplary purposes only and should not be construed to limit the scope and breadth of the present invention.

Figure 1:
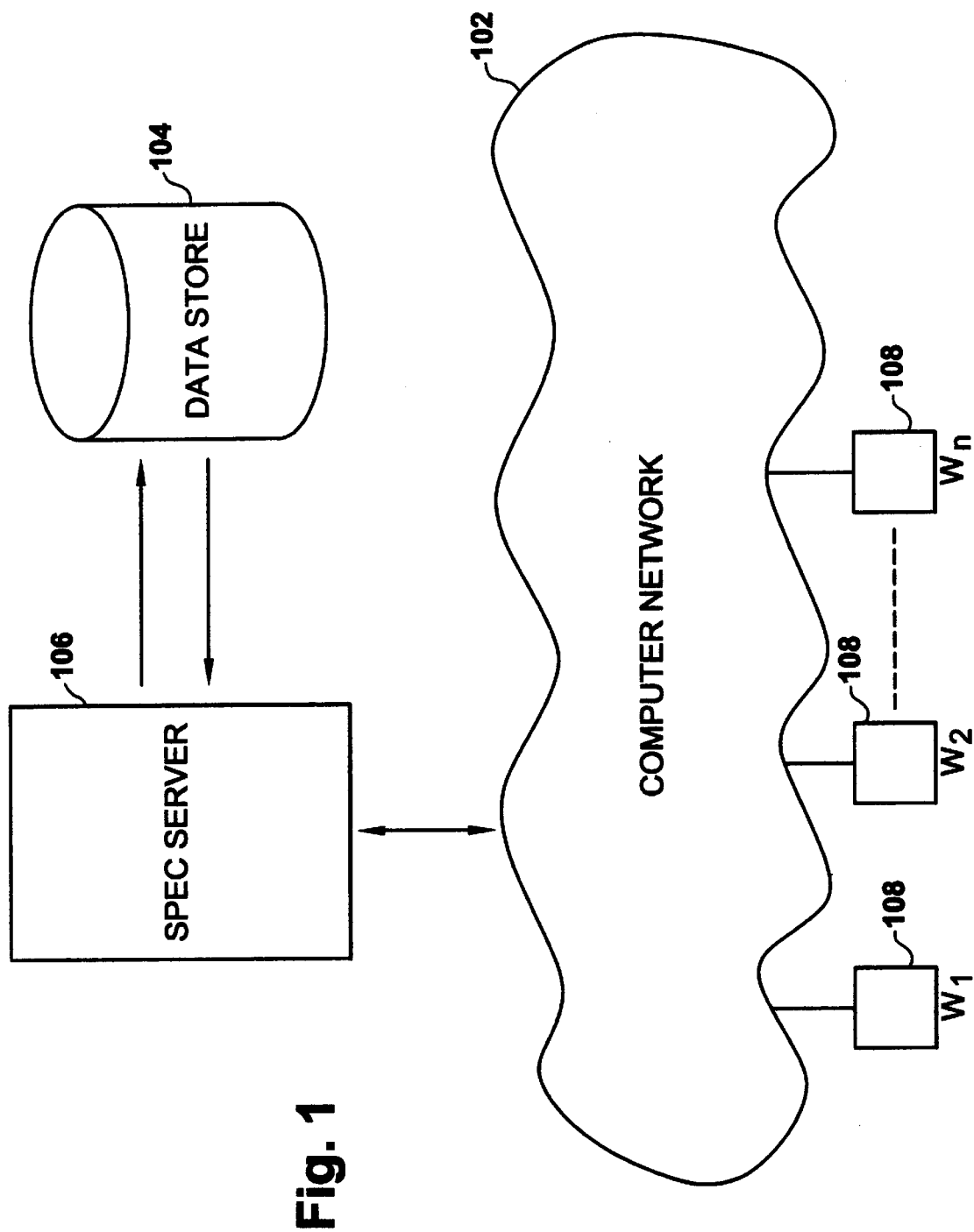
FIG. 1 is a block diagram depicting an example operational environment according to a preferred embodiment of the present invention.

FIG. 1 is a block diagram depicting an operational environment according to a preferred embodiment of the present invention. A spec server ruining software to implement a preferred embodiment of the present invention is depicted as block 106. An exemplary computer system that can be used to implement the spec server 106 is subsequently described below with reference to FIG. 12.

The spec server 106 is coupled with a data store 104. The data store 104 is used to store data associated with the spec server 106. A data store can be any type of data storage device, such as a memory device or a data base management system (DBMS).

In the examples presented herein, a DBMS 104, also referred to as "the data base 104", is used to implement the data store 104. In one embodiment, a relational database, such as the Informix® data base system provided by Informix Software Incorporated of Menlo Park Calif. is used. However, in other embodiments, different storage devices can be used, including memory devices, and other types of data base management systems, such as non-relational data base systems, customized data base systems, and other generally available data base systems. Thus, the use of the term data base 104, is for exemplary purposes only, and should not be construed to limit the scope and breadth of the present invention.

The spec server 106 is coupled to a computer network 102. The computer network 102 used in this example embodiment is the Internet. The Internet 102 is especially advantageous to be used in conjunction with the present invention because of its wide use and wide availability. However, any type of computer network can be used in alternate embodiments of the present invention.

A plurality of end users gain access to the spec server 106 from the workstations W1, W2, . . . WN 108 (also referred to as the "web interface" 108), via the Internet 102. Any commonly available web browser such as Internet Explorer provided by Microsoft Corporation, or Netscape Navigator provided by Netseape Corporation, can be used to interact with the spec server 106 from any of the workstations 108. Another example of a workstation 108 is a non-typical workstation or web access tool, including set-top boxes such as Microsoft's WebTV and the like. These web access tools are specifically designed to interact with the Internet 102 and typically provide services very similar to the services provided by commonly available web browsers as described above.

A distinct advantage of the present invention is that the only requirement by end users is that the workstations 108 provide common web browsing input/output functions. Typically this includes HTML and JavaScript compatibility. In this fashion, anyone using a web-browsing tool can interact with the spec server 106 of the present from anywhere in the world. This is accomplished without having to install additional software and/or hardware to the workstations 108.

It should be noted that the use of the term "web browser" 108 is used for exemplary purposes only to describe the present invention in terms a preferred embodiment. However, as mentioned, any type of computer network 102 can be used to implement the present invention. Consequently, any type of display and/or program to display computer images or text, can be used with the present invention. As such, the term web browser 108 should not be construed to limit the scope and breadth of the present invention.

It should also be noted that spec server 106 is depicted as a single box for simplicity. This does not indicate nor suggest that a single computer system should be used to implement the spec server 106. Indeed one or more computer systems can be used to implement the spec server 106 according to a preferred embodiment of the present invention. Preferably, when multiple computer systems are used, a high-speed local area network or the like is employed to provide communications between the various components of the spec server 106. The use of such a network would be apparent to persons skilled in the relevant art(s).

An example of a preferred set of components that can be used to implement the spec server 106 according to a preferred embodiment of the present invention is depicted in FIG. 2A. It should be noted that these components are shown for exemplary purposes only to fully describe and clearly point out the features and functions of the present invention. In other embodiments, different components can be used to implement the features and functions of the present invention as described herein. After reading the following detailed description, it will become apparent to persons skilled in the relevant art(s) how to implement the present invention using components other than those that are described herein. Accordingly, the use of these exemplary components should not be construed to limit the scope and breadth of the present invention.

As shown in FIG. 2A, a content editor 204 is coupled to the data base 104. The content editor 204 is used by an industry expert 202 to completely describe and define a particular domain. One output from the content editor is a domain tree (not shown). The domain tree is stored in the data base 104. Details of a domain tree are subsequently described in detail below with reference to FIG. 3.

In order to fully describe the details of the present invention, a particular type of domain tree will be described in the examples presented herein. In particular, the domain tree used in the examples below is one that is associated with the printing industry. Thus, the subject matter of the domain used in the examples presented herein is all products produced by the printing industry. Subsets of the domain tree are used to create specs or spec templates for particular products. These subsets of the domain tree are referred to herein as component trees. The object of a complete domain tree is to include every possible option associated with the domain. In this example, a complete domain tree for the printing industry includes every type of option that can be specified for every type of printing product available in the industry.

It should be noted that this example of a printing industry domain tree is just one example of a domain tree that can be created using the present invention. The present invention is by no means limited to this type of application, or any type of application for that matter. Indeed a major advantage of the present invention is that it can be used to create any type of spec imaginable from any type of domain tree. For example, specs could be used as a learning device to create adaptive tests for students. After reading the examples presented herein pertaining to the printing industry, it will become apparent to persons skilled in the relevant art(s), how to apply the principles of the present invention to any type of user-defined generic spec.

In the printing industry examples below, users at the web interface 108 interact with the spec server 106 for the purpose of creating (i.e. completing) specs related to the printing industry. These specs are typically used to generate requests for price quotations for printing requirements. For example, users at the web interface 108 complete specs to generate RFQs for printing products such as annual reports, posters, labels, advertising brochures, billboards, books, book covers, pamphlets, etc. The object of a completed spec is to locate suitable suppliers and to provide those suppliers with enough information to enable them to bid for the requested products by producing RFQs.

Consequently, the domain tree created by the industry expert 202, preferably contains enough information so that users are provided with an opportunity to select every possible option available for every type of product defined in the printing domain. As stated, individual specs are generated using sub-sets of the domain tree referred to as component trees. Thus, the domain tree should embody every printing option intended to be available to users.

An advantage of the present invention is that once a domain tree is created, it is a trivial matter to produce a plurality of component trees that are then used in individual specs for particular products that fall within the domain. For example, once a domain tree is created for the printing industry, it is a trivial matter to create a series of specs that relate to particular products, such as book covers, annual reports, etc.

Accordingly, referring back to FIG. 2A, the industry expert 202 creates a domain tree, via the content editor 204. In this example, an expert in the printing industry 202 inputs a wealth of information associated with the printing industry. This information is input into the data base 104.

In this example, the information input by the industry expert 202 includes knowledge about every option available in the printing industry. For example, information related to all types of paper, printing presses, ink, colors, artwork, etc., should be included in the domain tree. As described below, the content editor 204 provides tools that assist the industry expert 202 in organizing data to facilitate the process of creating a domain tree.

The page builder component 208 is used to build spec pages that are presented to users at the web interface 108.

These spec pages are dynamically constructed and depend upon the component trees used to define the spec, and the path (i.e. previous answers) taken by users. For example, if a user selects certain options on one web page, items on future web pages appear that specifically relates to the previously selected options.

The web pages generated by the page builder 208 preferably contain prompts to the user and typically include common user interface controls such as data entry fields, list boxes, drop-down boxes, check boxes, push buttons, radio buttons and the like. Such prompts and controls are specified by the industry expert 202 via the content editor 204, when the domain tree is created. In a preferred embodiment, HTML and JavaScripts are used by the page builder 208 to display the pages and accept data from users, via the web browser 212 at the web interface 108.

In a preferred embodiment, a cache builder 206 is used to pre-process certain pages and/or portions of pages that lend themselves to pre-processing. That is, pages or portions of pages can be built in advance of the dynamic spec entry phase are built by the cache builder 206. The cache builder is an optional component that can be used with the present invention to increase the performance of the overall system from a users standpoint.

In particular, the cache builder 206 preferably generates a specific program for each page that is generated in advance of user input. In a preferred embodiment, the cache builder module 206 is implemented using a combination of JavaScripts and Web DataBlade code. Web DataBlade is a programming tool used to build HTML web pages, provided by Informix Corporation.

The specific programs generated by the cache builder 206 preferably contain logic that depends upon the run-time environment. In this fashion, pages are customized for each user, depending on the particular path taken during run-time, even though the program is compiled well in advance of user input.

The content reader 210 receives user information from the web browser 212 and stores it in the data base 104. Preferably, data entered by users is pre-validated by the web browser 212. In an alternate embodiment, the content reader 210 validates data received from the web browser 212. The type of data required by the user is specified by the industry expert 202, via the content editor 204, when the domain tree is created.

The rule processor 214 reads a set of rules defined by the industry expert 202. These rules are stored in the data base 104. In particular, the rule processor 214 reads rules from the data base 104 and builds a set of flags in accordance with those rules and the run-time environment based on user input. These flags are read by the page builder 208 and are used to determine incompatible options and whether to include or omit certain options on web pages. For example, the logic included in the programs generated by the cache builder 204 may depend on the flags set by the rule processor. In this fashion, certain questions may or may not be presented to the user based on previous user input.

The template generator 216 is used to generate an output 220. In this example, the output 220 is used by suppliers to provide price quotations to users. This output can be in the form of facsimiles 222, emails or other correspondence. The content and format of the output from the template generator 216 is specified by the industry expert 202.

In particular, the industry expert inputs a set of rules used by the template generator to extract and format user data in accordance with pre-defined specifications. In particular, each question, and/or related group of questions is associated with a particular output rule. When the template generator 216 is executed, the data comprising the completed spec is evaluated to determine what questions have been answered. The rules associated with each of the answered questions are then extracted. Each rule is then used to create a sliver of output. The aggregation of slivers of output comprises the completed RFQ, which is then faxed, emailed or otherwise disseminated to suppliers.

The format of the output depends on the needs and requirements of each specific implementation of the present invention. In one embodiment, the output is formatted using postscript commands. In this example, the final RFQs are printed on a postscript printer and faxed to suppliers. In another embodiment, the output is formatted in HTML, so that suppliers can either receive an electronic copy of the RFQs via email, or may log into the spec server 106 and view the RFQs from customers in a real-time fashion. Specific methods that can be used to format the output in accordance with these principals would be apparent to persons skilled in the relevant art(s).

The compatibility engine 218 is used to compare completed specs with other completed specs. For example, the compatibility engine 218 can be used to compare a print request with a supplier profile to determine whether a supplier is capable of providing the subject of the print request to the user. The compatibility engine 218 can also be used, for example, to compare a print request to another print request to determine whether the jobs can be combined. The compatibility engine 218 can also be used, for example, to compare a print request with a spec from a financial institution to determine whether the print request could be financed by the financial institution.

In another example, the compatibility engine 218 can be used to determine whether a shipping company could handle shipment for the request. In general, the compatibility engine is used to compare any completed spec with any other completed spec to determine if the specs are compatible. Compatibility rules are defined by the industry expert 202 and are stored in the database 104.

A very typical example of a use for the compatibility engine 218 is to find suppliers that are compatible with completed specs. In this example, suppliers complete a spec that profiles their capabilities. Accordingly, a plurality of supplier profiles is stored in the data base 104. The compatibility engine 218 is then used to compare completed user specs with each of the supplier profiles stored in the database 104 to determine which suppliers are compatible with the print requests.

To accomplish this task, compatibility rules are specified by the industry expert 202. For example, if the user spec indicates that a print size of 11×17 is required, then the supplier must have a printing press that can handle sizes of 11×17 or larger to be compatible. Thus, a rule that links these two conditions is specified.

In particular, a set of compatibility rules exists for each type of comparison being made. For example, one set of compatibility rules exists for a comparison between completed user specs and supplier profiles. In this example, the goal of the compatibility engine 218 is to find suitable suppliers for print requests. Typically, each rule can be classified as being either required or optional. In addition, each rule can be weighted in accordance with its relative importance. In this fashion, a confidence level of compatibility is reported to users along with the list of compatible suppliers.

In particular, the industry expert inputs a set of rules used by the compatibility engine 218. The compatibility engine 218 evaluates the source spec to determine which rules are applicable to the particular source spec. In this example, the source spec is the user spec, and the target spec is the supplier profile. The applicable rules depend on which answers have been completed in the source spec. Next, the compatibility engine 218 extracts the applicable rules from the data base 104 and applies them against the source spec.

For example, one rule may state that if a print size of 11×17 is requested, the supplier must have a press that can print pages of at least 11×17. In this example, the source spec indicates that a print size of 11×17 is requested. As such, when this rule is applied against the source spec, the output rules states that the target spec must have a printing press that handles page sizes of 11×17 or greater. This is an example of a required rule. That is, if the target does not meet this requirement, it is immediately eliminated as a compatible spec.

Next, the rules are applied against the target spec. First the required rules are applied so target specs can be immediately eliminated, as described above. Next, the non-required rules are applied. As stated, the non-required rules are generally weighted in terms of their relative importance so that a weighted average of compatibility can be presented to the user.

Figure 2B:
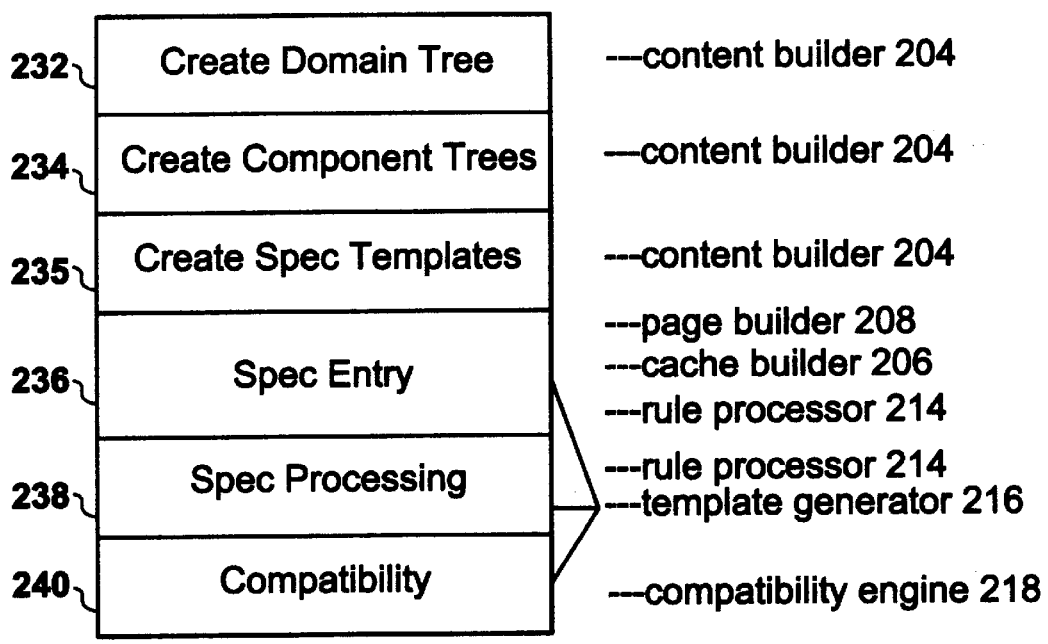
FIG. 2B is a block diagram depicting a five-phase process that can be used to implement a preferred embodiment of the present invention.

FIG. 2B is a block diagram depicting five phases involved in the creation, completion and processing of specs according to a preferred embodiment of the present invention. Also included in FIG. 2B is a listing of the components from FIG. 2A associated with each phase.

The first phase is the creation of a domain tree 232. The content builder 204 is used to perform this phase. As stated, during the domain tree creation phase 232, the industry expert 202 inputs a wealth of knowledge associated with the domain.

After a domain tree is created, the content builder 204 is again used in phase 234 to create one or more components. Components are sub-sets of the domain tree and are referred to herein as component trees.

Next, in phase 235, the industry expert creates spec templates. In one embodiment, the content builder 204 is used to create spec templates. Each spec template is used to define a particular product spec. Typically, the industry expert creates a spec template by defining one or more optional or required components for the spec. Preferably, this is accomplished by specifying a minimum and maximum number for each component. This refers to how many times the component may appear in a spec. For example, a product, such as an annual report, may have one or more bodies. Thus, a component representing a body may appear more than once in a particular spec.

In addition, some components are optional. For example, the inclusion of a user-supplied insert is an optional component for an annual report spec. Accordingly, if the specified minimum is zero, the component is deemed optional and is only included in the user spec if the user selects the component. The optional component may be added one or more times, depending on the specified maximum.

Similarly, if the minimum is non-zero and the maximum is some number other than the minimum, the user has the option to select any number within that range to be included in the spec. The industry expert can also specify the same non-zero number for the minimum and the maximum. In this case the component is automatically included in the spec a number of times equal to the number specified by the industry expert.

Phase 236 represents a process where a user, at the web interface 208, interacts with the spec server 106 to complete one or more specs. Typically users are presented with dynamically generated web pages. The content of these web pages change in accordance with options and answers selected by users. As shown, the page builder 208, the cache builder 206 and the rule processor 214 are involved in the spec entry phase 236.

The next phase is the spec processing phase 238. In phase 238, content reader 210 receives information from the user and stores it in the data base 104. As shown in FIG. 2B, the user can launch the template generator 216, anytime after a first page is completed in the spec entry phase 236.

The final phase depicted in FIG. 2B is the compatibility phase 240. In the compatibility phase 240, the compatibility engine 218 finds a set of completed specs that are compatible with other completed specs. In one example, user specs are compared against specs completed by suppliers. Once a set of compatible suppliers is determined, the outputs from the template generator 216 in phase 238 are typically sent to the compatible suppliers so they can generate price quotations therefrom.

Figure 2C:
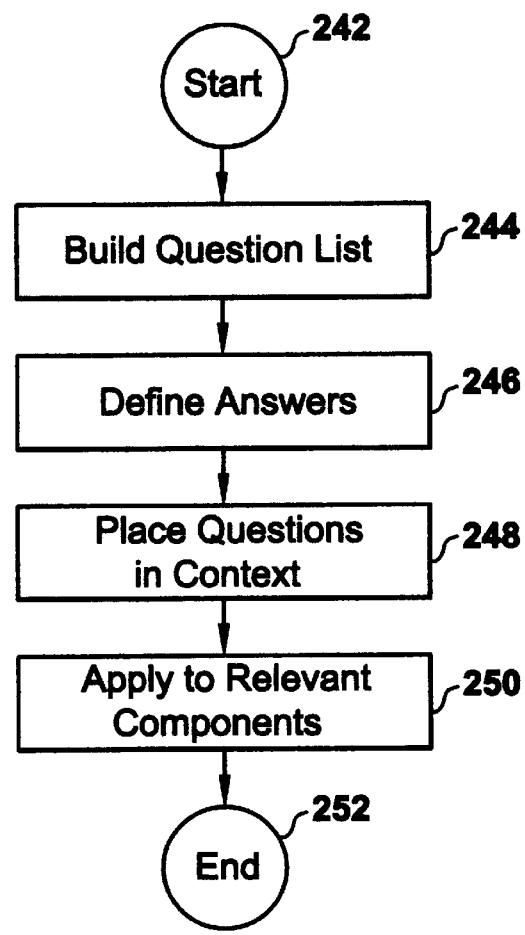
FIG. 2C is a flowchart depicting a method that can be used to create domain and component trees, according to a preferred embodiment of the present invention.

FIG. 2C is a flowchart depicting a process that can be used to create a domain tree and a set of component trees, according to a preferred embodiment of the present invention. An example of a visual representation of a domain tree and a component tree is described below with references to FIGS. 4 and 5, respectively.

The process to create a domain tree and a set of component trees begins with step 242, where control immediately passes to step 244. It is noted that this process is preferably accomplished with the use of the content editor 204. In step 244, the industry expert builds a list of questions. Typically, the industry expert considers and reduces to writing, any and all possible questions that can be asked in a spec context, related to the domain that is the subject of the domain tree. These questions are input into the content editor 204.

For example, using the printing industry example, the industry expert inputs questions used to specify printer products. It is noted that at this time, no particular product is specified by the industry expert, and specific products are not yet associated with each question. However, it helps to think about particular products when compiling the question list in step 244.

In step 244, the industry expert also specifies the language specific label associated with each question. The label is the visual prompt that will later be displayed to the user during the spec entry phase 236. In addition to the label, the industry expert specifies the type of answer required for each question and the type of user interface control associated therewith.

Preferably, the content editor 204 provides the industry expert with a choice of user interface controls that are available. Examples of such user interface controls include, selection check boxes, data entry fields, drop down list boxes, radio buttons, push buttons and the like. The industry expert also typically specifies the form of the data, i.e. numerical, alphanumerical, date format, etc.

Next, in step 246, the industry expert defines the answers for the questions entered in step 244. Thus, for example, the industry expert specifies all of the possible options that are to be displayed in the list box or next to the check box (es) during the spec entry phase 236. Once all answers are defined, control passes to step 248.

In step 248, questions are grouped in a hierarchy. The content editor 204 is used to assist the industry expert in this process. For example, the content editor 204 allows the industry expert to specify group names for lists of questions that are related. In the printing domain for example, groups of questions can relate to categories such as ink, paper, coating, finishing, etc. Thus, in step 248 the industry expert places questions in context, by adding sections or placeholders for the questions. The creation of the domain tree is complete with the completion of step 248. Control next passes to step 250.

Step 250 takes place in phase 234, where one or more component trees are created. A component tree is created by applying (i.e. selecting and marking), relevant portions of the domain tree to specific components. Thus, the industry expert decides which domain nodes are to be included in a particular component. Domain nodes are discussed in more detail below.

Each component tree is a subset of the domain tree created in steps 244–248. As stated, once a domain tree has been created, it is a minor task to create multiple component trees therefrom. Each component tree defines a particular component. Particular components are then subsequently used in spec templates to create specs.

The content editor 204 is used to create component trees. This is accomplished by specifying the name of the component, and then selecting portions from the domain tree that apply to the component. This is preferably accomplished by picking and choosing applicable sections from the domain tree. Thus, for example, to create "cover" component, the industry expert simply selects those portions of the domain tree related to a cover.

Figure 3:
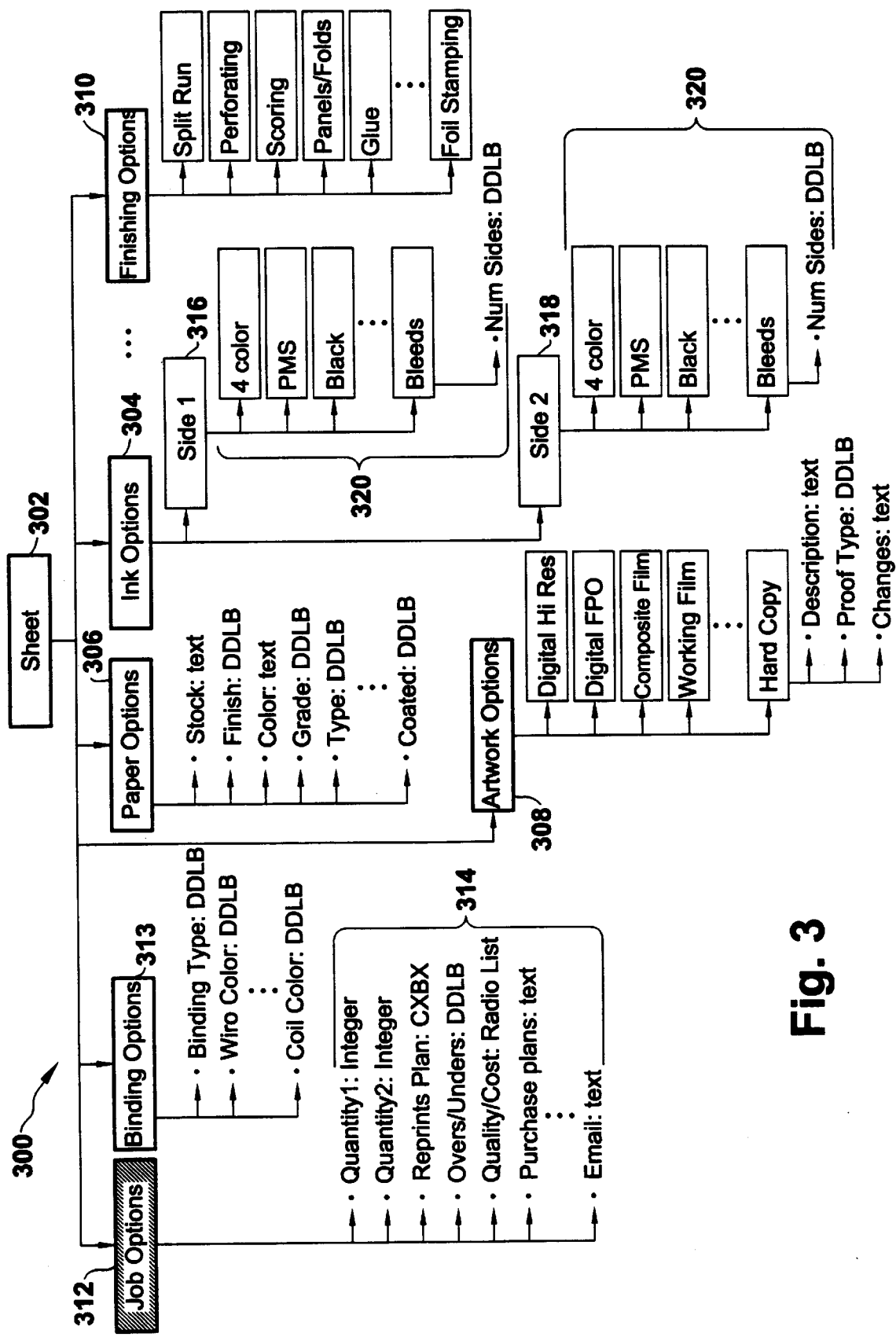
FIG. 3 is a block diagram depicting a visual representation of a domain tree, according to a preferred embodiment of the present invention.

FIG. 3 is a visual depiction of an example of a domain tree 300, according to a preferred embodiment of the present invention. In this example, the domain tree 300 shown is a small portion of a domain tree associated with the printing industry. In particular, the domain tree 300 can be used to generate product components and product specs for the printing industry.

The root node of the domain tree is the Sheet node 302. A Sheet node is used in this example because most print products can be distilled down to the printing of a sheet. Recall, that specific products are not specified until component trees are created. An example of a component tree is described immediately below with reference to FIG. 4A.

Descendant Nodes are depicted below the root node. These descendant nodes are referred to herein as domain nodes. Domain nodes can have many types of attributes. In general they arc used to organize or group the domain tree into logical sections. The logical sections were created as a result of step 248, in FIG. 2Cwhere the industry expert places questions in context. As described below, the actual questions are the lowermost child nodes in the domain tree, and are referred to herein as variable nodes.

Referring to FIG. 3 the Job Options node 312 is an example of a domain node that is a section (also referred to herein as "section nodes)." Directly below the Job Options section node 312 are a series of variable nodes 314. These variable nodes 314 correspond directly to the questions that were created by the industry expert in step 244 of FIG. 2C. In particular, variable nodes specify information related to questions and/or options presented to users during the spec entry phase 236 of FIG. 2B.

For example, as shown in FIG. 3, the text of each question, as well as the type of user interface control used to present the question, is included in each variable node. For example, as can be seen by the first variable in the variable set 314, a text prompt "Quantity 1" is specified. This is used to prompt the user to enter data into a data entry field to indicate a first quantity. In addition, as indicated by the variable node 314, this particular text entry field is only to accept integer data.

The other variable nodes shown in the variable set 314 specify different controls such as drop-down list boxes, radio list buttons and entry fields that accept any type of alphanumeric data. Other information included in variable nodes, such as the variable set 314, includes a list of choices, default answers and/or a subset of the list of choices associated with the question.

It should be noted that domain nodes can provide additional information, such as formatting information and the like. For example, if a group of domain nodes are to appear together on a spec page, a node referred to as a grouping node can be used to specify this option. Similarly, if additional text is to appear with a particular variable node, a text node can be placed next to the associated variable node for this purpose. Such additional nodes that can be defined in the domain tree 300 depend on each specific implementation of the present invention. Any such definitions must be supported by page builder 208 and/or cache builder 206 components. Specific methods that can be used to implement these features would be apparent to persons skilled in the relevant art(s).

The other section nodes that are direct descendants (i.e. children or child nodes), of the root node 302 are the Binding options 313, the Artwork Options 308, the Paper Options 306, the Ink Options 304 and the Finishing Options 310 nodes. Some of these section nodes have other section nodes below them in the hierarchical domain tree data stricture 300.

For example, the Artwork Options section node 308 has several child section nodes below it, such as the Digital Hi Res node and the Digital FPO node. As described in detail below, these nodes are used as an organization tool to facilitate the spec entry process in phase 236 of FIG. 2B.

It should be noted that each section node typically ends with one or more variable nodes. Not all of the variable nodes are shown in the example in FIG. 3. Thus, for example, the Digital Hi Res section node under the Artwork Options node 308 typically contains one or more child nodes (not shown) that are variable nodes and comprise actual options or questions to users.

It should also be noted that an object of the present invention is to minimize duplication of data stored in the data base 104. Preferably, data is shared among nodes wherever possible, such that no data is entered more than once in the data base 104.

An example of this can be seen under the Ink Options node 304. It is noted that the Side 1 node 316 and the Side 2 node 318 have identical descendant section and variable nodes 320. Therefore, in order to avoid storing this information twice, pointers are used in the Side 1 316 and Side 2 318 nodes to reference this data. Specific methods to implement this feature of the present invention would be apparent to persons skilled in the relevant art(s).

As stated, a relational database system, such as the Informix® data base system is preferably used to implement the data base 104 of the present invention. Therefore, the domain tree 300 is preferably implemented using a plurality of relational data base tables, such as those provided by Informix and other similar data base management systems. Specific methods that can be used to organize and store the domain tree 300 using data base tables in a relational data base system 104 are too numerous to detail here. However, specific methods to perform this task would be apparent to persons skilled in the relevant art(s).

Figure 4A:
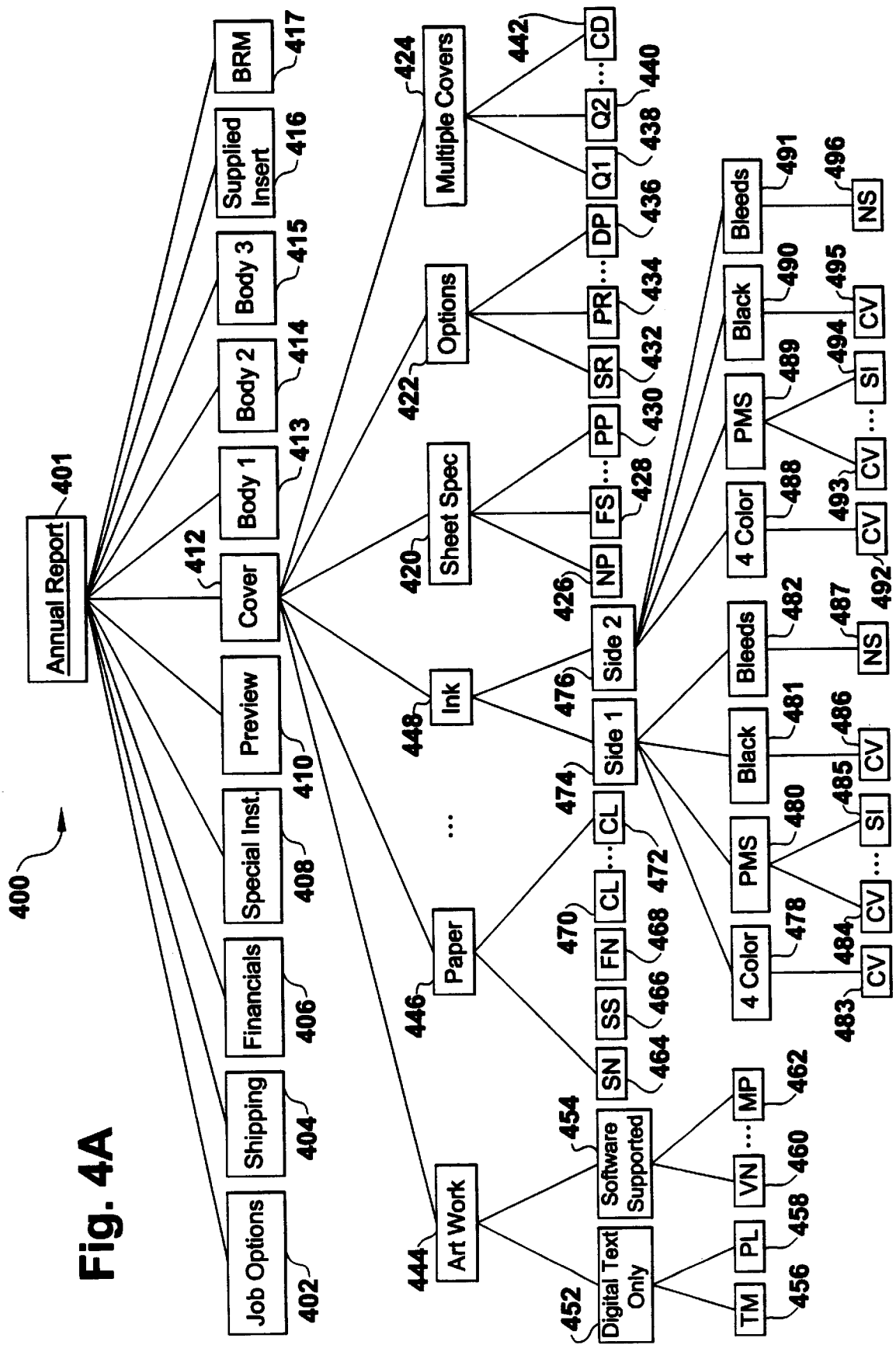
FIG. 4A is a block diagram depicting a visual representation of a component tree, according to a preferred embodiment of the present invention.

FIG. 4A is a block diagram depicting a visual representation of a component tree and a spec template, according to a preferred embodiment of the present invention. In particular, FIG. 4A shows a visual depiction of a dynamically constructed spec, in which a number of components 402–417 have been selected. In addition, FIG. 4A shows one component tree in detail, namely the Cover component tree 412.

The root node 402 represents a particular instance of spec for an Annual Report. In this example, a number of components 402–417 are included in the annual report spec. As stated, the number and frequency of components that comprise a particular instance of a spec, depend upon the spec template and user-selections made during the spec entry phase 236 (see the spec definition page 431, below). In this fashion, each particular instance of a spec is dynamically constructed during run-time.

An example of a spec definition page 431 that can be used to for defining components that are to be included in a particular instance of a spec is shown in FIG. 4B. This spec page 431 is preferably built by the page builder 208 or the cache builder 206, in accordance with the spec template definitions. In particular, as stated above, each template includes a minimum and maximum number for each component that can be included in the spec. The page builder 208 or cache builder 206 uses these component definitions to construct the web page 431.

In FIG. 4B, a list of components 429 is presented to the user. To the right each component is a drop-down list-box, such as the list box 419, that is used to accept a value from the user. This value defines the number of times the associated component is to appear in the spec. Note that in one embodiment, if the range of a particular component is equal to 0–1, then instead of a drop-down list-box, a check box is used to indicate whether to include or omit the associated component.

Accordingly, in this example of an instance of an annual report spec 437, the user selects: 3 body components 419; 1 supplied insert component 421; 0 double panel B/Card insert components 423; 1 BRC/BRM insert component 425; and 0 single panel B/Card components 427.

It should be noted that the values in the drop-down lists, such as the drop-down list 419, correspond to a range of values, from the minimum to the maximum, as defined in the spec template. It should also be noted that components, which are defined as required components having a fixed frequency, are not shown on page 431. This is so because the user has no choice with respect to such components at run-time.

Referring back to FIG. 4A, the component nodes 402-417 represent a set of components that comprise a particular instance of an Annual Report spec. This example spec corresponds to the user-specified components shown in FIG. 4B. In this example, the components 402–412 are required components that are to appear exactly once in each instance of an Annual Report spec. Accordingly, because the user has no choice with respect to these components 402–412, they are not included on the spec definition page 431.

The remaining components 414–417 correspond to the frequency and selection of components as defined by the user on the spec definition page 431. Accordingly, FIG. 4A depicts 3 body components 413, 414, and 415, a Supplied Insert Component 416 and a BRM component 417.

In this example, only the Cover component node 412 is partially expanded to display the details of a component tree.

As shown, 6 direct descendants of the Cover node 412 are depicted. These child nodes are the ArtWork node 444; the Paper node 446; the Ink node 448; the Spec Sheet node 420; the Options node 422; and the Multiple Covers node 424.

The Sheet Spec node 420 has three child nodes 426–430 depicted in FIG. 4A. These are referred to herein as variable component nodes. Variable nodes represent actual questions or options that are to be answered and/or selected by users during the spec entry phase 236. In this example, the variable node NP 426 represents a data entry field with a prompt ("number of pages") that is to be displayed to the user during the spec entry phase 236.

It is noted that all of the bottom child nodes that are represented by two capital letters in FIG. 4A are variable component nodes. In particular, the nodes 426–442, 456–462, 464–472, 483–487 and 492–496 are variable component nodes. For simplicity, the questions, and/or options that are presented to users as a result of variable nodes are hereinafter referred to as "questions."

Component section nodes can also posses an additional attribute referred to as an outline node. Any component section node can be designated as an outline. The industry expert 202, via the content editor 204, specifies this designation. As will be described below, outline nodes are used to populate a navigation bar to assist the user during the spec entry phase 236. Examples of navigation bars are shown below in FIGS. 5 and 6.

Nodes that have been designated as outline nodes in this example are depicted with bold and italicized text. Accordingly, the nodes, Job Options 410, Cover 412, Body 414, Shipping 418, Art Work 444, Paper 446 and Ink 448 are outline nodes.

In addition, the industry expert can also designate any domain section node as an exportable node. In this example, the first row of outline nodes, namely the component nodes 402–417 are also exportable nodes. Nodes that are designated as exportable can become the starting point or root nodes of component trees, such as the components represented by the nodes 402–417.

For example, many products in the printing industry use covers. Thus, the Cover sub-tree (that is the Cover node 412 and the descendant nodes beneath it), can be shared among specs or templates by designating the Cover node 412 as an exportable node.

FIGS. 5–10 depict a series of web pages that can be generated from the domain tree 300 and the component tree 400. In this example, only the web pages generated from the expanded portion of the component tree shown in FIG. 4A are discussed. In particular, the web pages associated with a cover for an annual report (nodes 412 and 406) are described below. After reading the description below, it will become apparent to one or ordinary skill in the relevant art(s) how to generate web pages for any portion domain tree or component tree.

Figure 5:
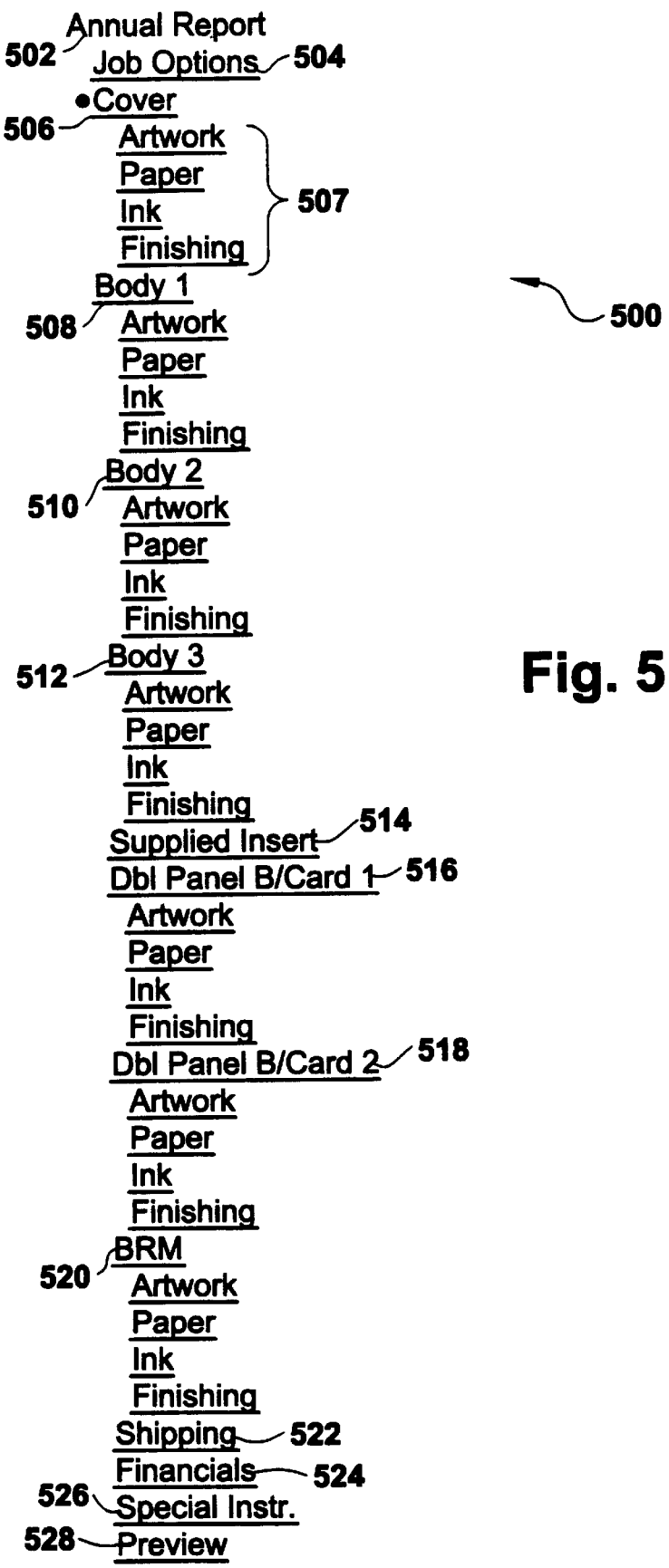
FIG. 5 is an example of a navigation bar generated from the spec defined in FIG. 4B, according to a preferred embodiment of the present invention.

FIG. 5 represents an example of a navigation bar. The navigation bar is constructed to allow a user navigate through a spec. Each navigation bar item represents a separate web page in the spec. The content of the navigation bar depends on the contents of each particular instance of a spec. Therefore the navigation bar is constructed at run-time, after the completion of a spec definition page, such as the spec definition page 431.

In this example, this particular instance of an Annual Report spec 502 comprises the following components: Job Options 504; 3 body components 508, 510 and 512; Supplied Insert 514; 2 Double Panel B/Card components 516 and 518; BRM 520; Shipping 522; Financial 524; Special Instructions 526 and Preview 528. The indented navigation bar items that appear under each component, such as the items 507 that appear under the Cover 506 component, represent outline nodes, as described above.

Figure 6:
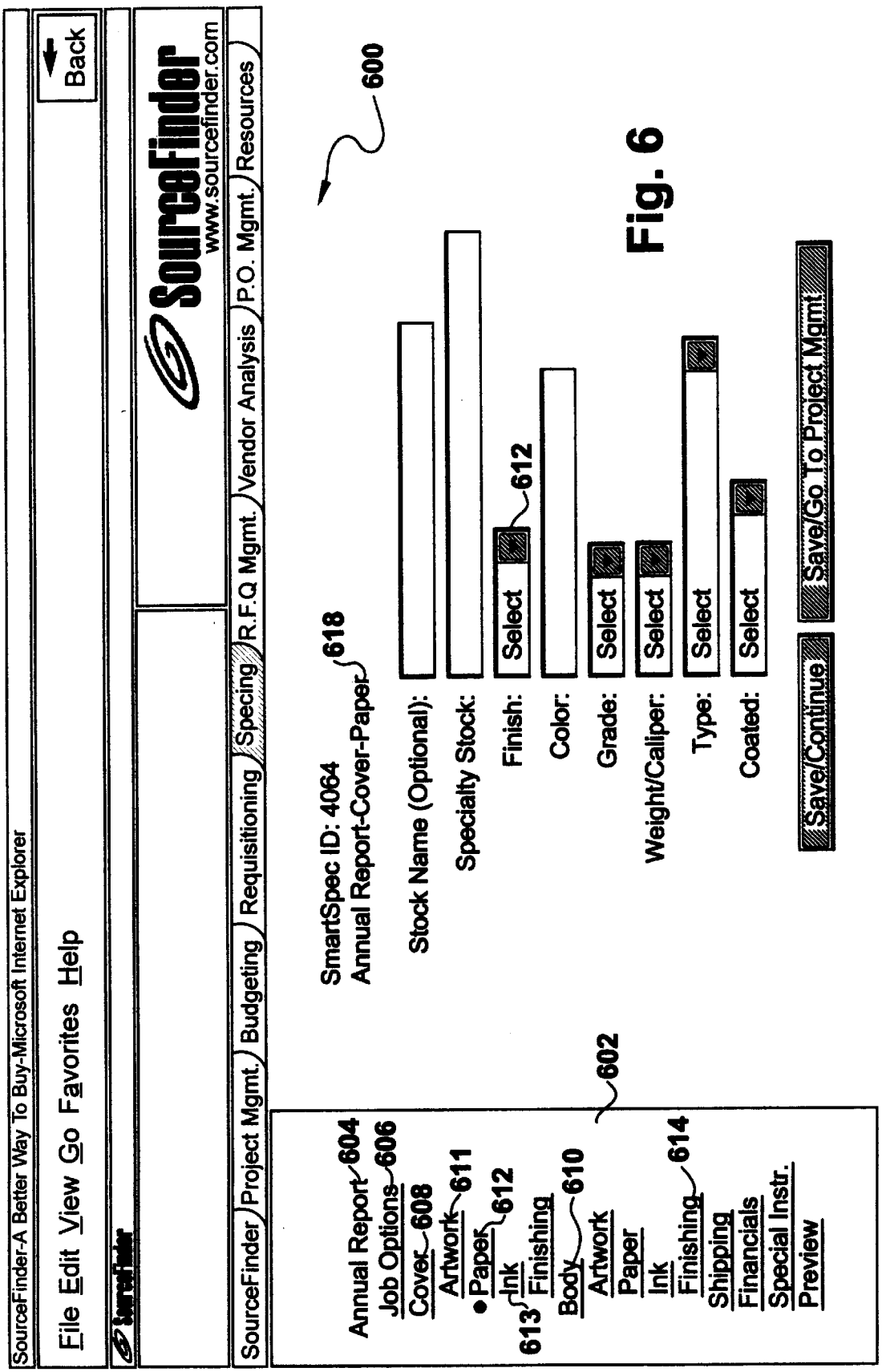

FIG. 6 is an example of web page 600, that includes another navigation bar 602. Note that the navigation bar 602, in this example, also represents separate web pages of an Annual Report spec (as indicated by the title 604). However, in this case, the navigation bar 602 is shorter than the navigation bar 500, because in this example, a less complex spec has been specified on the spec definition page 431.

The navigation bar 602 is used to allow the user to navigate through different pages or sections of the spec. The items in the navigation bar 602 map to the outline nodes in the component tree 400, as described above. For example, the Job Options navigation bar item 604 corresponds to the Job Options outline node 410. Similarly the Cover 608 and the Body 610 navigation bar items correspond to the Cover 412 and Body 414 outline nodes.

It should be recalled that child outline nodes in the component tree 400 represent sub-sections of the parent outline nodes. For example, the Paper outline node 446 is a sub-section of the Cover outline node 412. This relationship is also depicted in the navigation bar 602. In particular, sub-sections appear under their parent sections and are indented from the parent sections.

For example, the child outline node Artwork 444, which is a child of the Cover outline node 412, is displayed in the navigation bar 602 as an indented item 611 under the Cover item 608. Similarly, the Paper navigation bar item 612 and the Ink navigation bar item 613 both appear underneath and indented from the Cover navigation bar item 608. These navigation items correspond to the Paper, Ink and Cover outline nodes 446, 448 and 412, respectively.

Note that in this example, a visual indicator in the form of a dot is displayed next to the Paper navigation bar item 612. This indicates that the currently displayed web page is the Paper web page 600. This information is also displayed on the page header 618.

Each navigation bar item is a hyperlink to the web page represented by that item. Thus, by selecting different navigation bar items, users have the option to complete a spec in any order they wish. However, by completing a spec out of the suggested order indicated by the navigation bar, may result in a less advantageous spec entry phase 236.

This is so because of the dynamically generated web pages as described above with reference to the content reader 210 and the rule processor 214. It should be recalled that an advantage of the present invention is that the content of each dynamically generated web page can change depending on previous answers and selections by the user. This can assist the user in completing a spec by only presenting options that are relevant. However, by not following the order suggested by the navigation bar 602, users may not completely take advantage of this feature.

For example, suppose a user selects a particular finishing option on one web page. (An example of such finishing options 724–726 can be seen on the next web page 700, shown in FIGS. 7A & 7B). In this example, the rule processor 214 may provide that the options displayed on the finishing page web page later in the spec (see navigation bar item 614), depend on the finishing options 724–726 selected on page 700. In this fashion, only those selected options from page 700 would be displayed on the finishing page.

However, if a user jumps to the finishing page (i.e. by selecting item 614 in the navigation bar 602) before completing page 700, the user may be presented, for example, with all default options pertaining to all finishing types.

Accordingly, although the present invention provides tools that allow users to jump around the pages in a spec, it is not always advantageous to do so. This feature is completely dependent upon each specific implementation of the present invention.

Referring now to FIGS. 7A & 7B, the web page 700 represents an example of a first web page under the Cover component. Before describing the details associated with the individual fields comprising the web page 700, it is useful to describe which portions of the web page 700 is preferably constructed with the cache builder 206, and which portions are constructed with the page builder 208.

It should be recalled that the cache builder 206 is an optional component of the present invention that can be used to increase the performance of the spec server 106 by creating programs that represent portions of web pages in advance. This preferred method is suggested because a preferred embodiment of the present invention is implemented over the Internet 102, where performance is currently a major issue. This may not always be the case. Higher bandwidth and faster hardware may render this issue moot in the not to distant future.

If performance were not an issue, all of the web pages could be constructed dynamically, with the page builder module 208. In any case, whether the web pages are built dynamically, or pre-processed with the cache builder, the concepts presented herein remain the same. Thus, the present invention can be implemented with or without the presence of the cache builder component 206. However, as stated, due to current speeds and bandwidths, the cache builder 206 is used in a preferred embodiment.

It should be noted that the web page generation programs created by the cache builder 206, preferably use the run-time environment to determine page contents. For example, certain options are printed only if certain flags are set or contain a certain value. The value of the flag is set at run-time in accordance with the processing rules in the data base 104 and the path taken by the user during the spec entry phase 236. This is how the cache builder 206 dynamically determines which options to present to users, depending on user input, even thought the web page programs are created well in advance of run-time.

In this example, the cache builder 206 pre-processes the portion of the web page 700 depicted inside the dotted lines 704. The page builder 208 provides the header 702 and the destination footer 708. The header 702 and the destination footer 708 both depend on the current spec and therefore must be dynamically constructed during run-time. In particular, both the header 702 and the destination footer depend on a particular spec and are thus preferably generated in real time during the spec entry phase 236.

Conversely, the variables displayed inside the dotted line 704 can actually appear as a page in many of the component specs in the print domain 402. Specifically, any component spec that uses covers may potentially display this portion 704 of the web page 700.

The destination footer in this example is used to determine the next page that is to be displayed to the user after the save/continue button 708 is depressed. In some implementations of the present invention, the push button may indicate the name of the next spec page. Accordingly, the header 702 and destination footer 708 is generated by the page builder 208 at run-time.

The particular fields that comprise the web page 700 and their corresponding objects from the component tree 400, will now be described. The web page 700 is divided into three sections, the Sheet Specs section 710, the Options section 712 and the Multiple Covers section 714. These sections map directly to the Section nodes 420, 422 and 424, respectively.

Note that in the component tree 400, each of the Section nodes 420, 422 and 424 have a number of variable nodes, such as the variable nodes 426, 428 and 430. These variable nodes map to actual questions presented to users.

For example, the variable node NP 426 maps to the data entry field (and prompt) 718. The variable node FS 428 maps to the pull-down list box 720, and the variable node PP 430 maps to the pull-down list box 722.

In a similar fashion, the questions that appear under the Options section 712, map to the variable nodes that are children of the Options Outline node 422. In particular, the check box 724 maps to the variable node 432. The check box 726 maps to the variable node 434, and the check box 728 maps to the variable node 436.

Likewise, the questions that appear under the section Multiple Covers 714 map to the child variable nodes of the Multiple Cover outline node 424. In particular, the data entry field 730 maps to the variable node 438. The data entry field 440, maps to the data entry field 732, and the edit box 734 maps to the variable node 442.

It should be recalled that the industry expert 202 specifies information related to the display of each question in phase 232, via the content editor 204. Such information includes the size of the field necessary for the prompt, the length of data expected, the type of user interface controls, the format of the data entered by users, etc.

When a user at the web interface 108 completes the page 700, the save/continue push button is typically depressed. This action causes the page shown in FIG. 8 to be displayed. FIG. 8 represents a web page generated from the Art Work section node 444 and its descendants. In particular, the header 802 displays the name of each section nodes 444 and 412, as well as the name of the component node 401. The web page is again divided into sections, as shown by the visual cues, 804 and 806, which map to the section nodes 452 and 454, respectively. Under each section, (804 and 806) are questions 810, which correspond to the variable nodes 456–458 and 460–462, respectively. Upon completion of this web page 800, the user typically clicks on the save/continue button 812. When this occurs, the web page depicted in FIG. 9 is presented.

Figure 9:
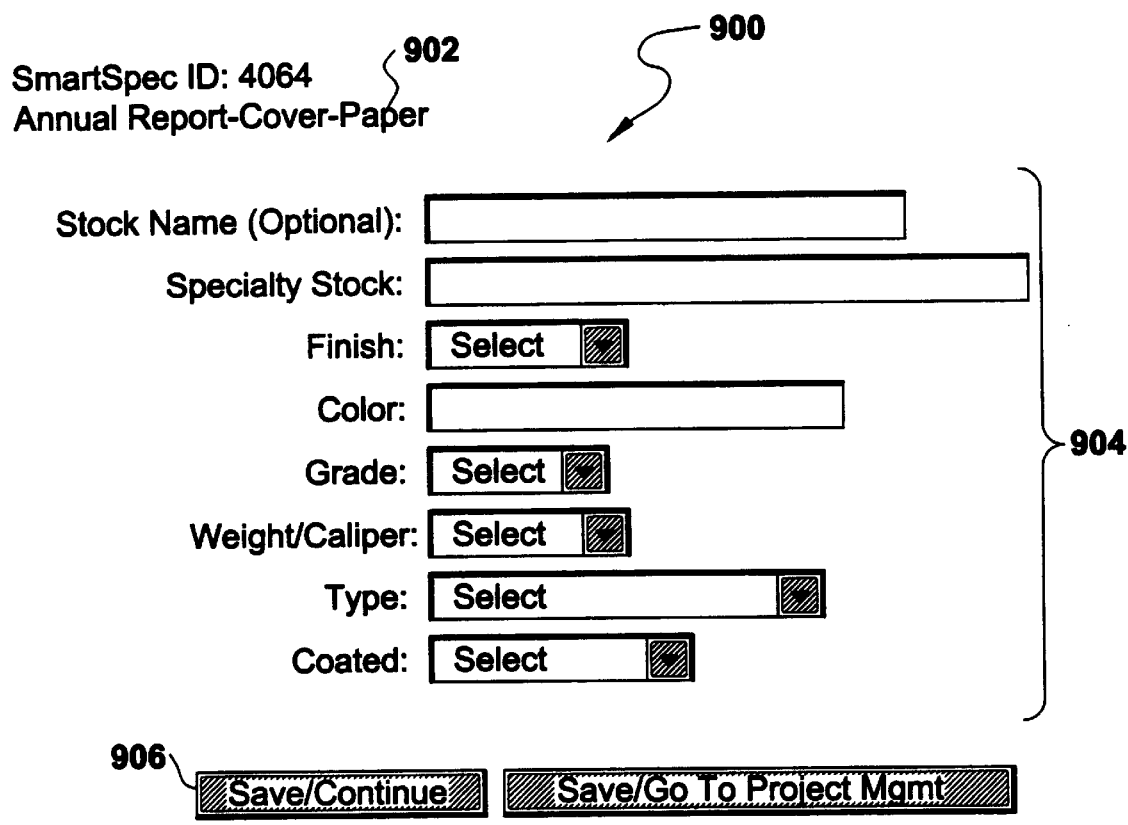

FIG. 9 represents a web page generated from the Paper section node 446 and its descendants. In this example, the only descendants of the Paper section node 446 are variable nodes. Thus, this page is not divided in sub-sections, as were previous pages.

Once again, the header 902 displays the name of the current outline node, in this case Paper 446, and the component node, in this case Annual Report 401, and all intervening outline nodes, in this case, Cover 412. Finally, questions 904 corresponding to the variable nodes 464–472 are presented. Upon completion, the user clicks on the save/continue button 906. This action causes the web page shown in FIGS. 10A & 10B to be displayed.

FIGS. 10A & 10B represents a web page generated from the Ink section node 448 and its descendants. The header 1002 shows the spec section by printing out the Component node 401, and the section nodes 412 and 448, as previously described. Once again the section nodes 474 and 476 are used to visually organize the page by breaking it into sections and sub-sections. The sections 1004 and 1006 map to the section nodes 474 and 476. The subsections 1008, 1010, 1012, and 1014 correspond to the section nodes 478, 480, 481 and 481, respectively. The questions presented to the user under each subsection, map to the child variable nodes of the corresponding subsection node. In particular, the question 1016 maps to the variable node 483. The questions 1018 map to the variable nodes 484–485. The question 1020 maps to the variable node 486 and the question 1022 maps to the variable node 487.The second main section 1006 dealing with Side 2 of the cover is exactly the same as the first section and will therefore not be repeated.

Figure 11:
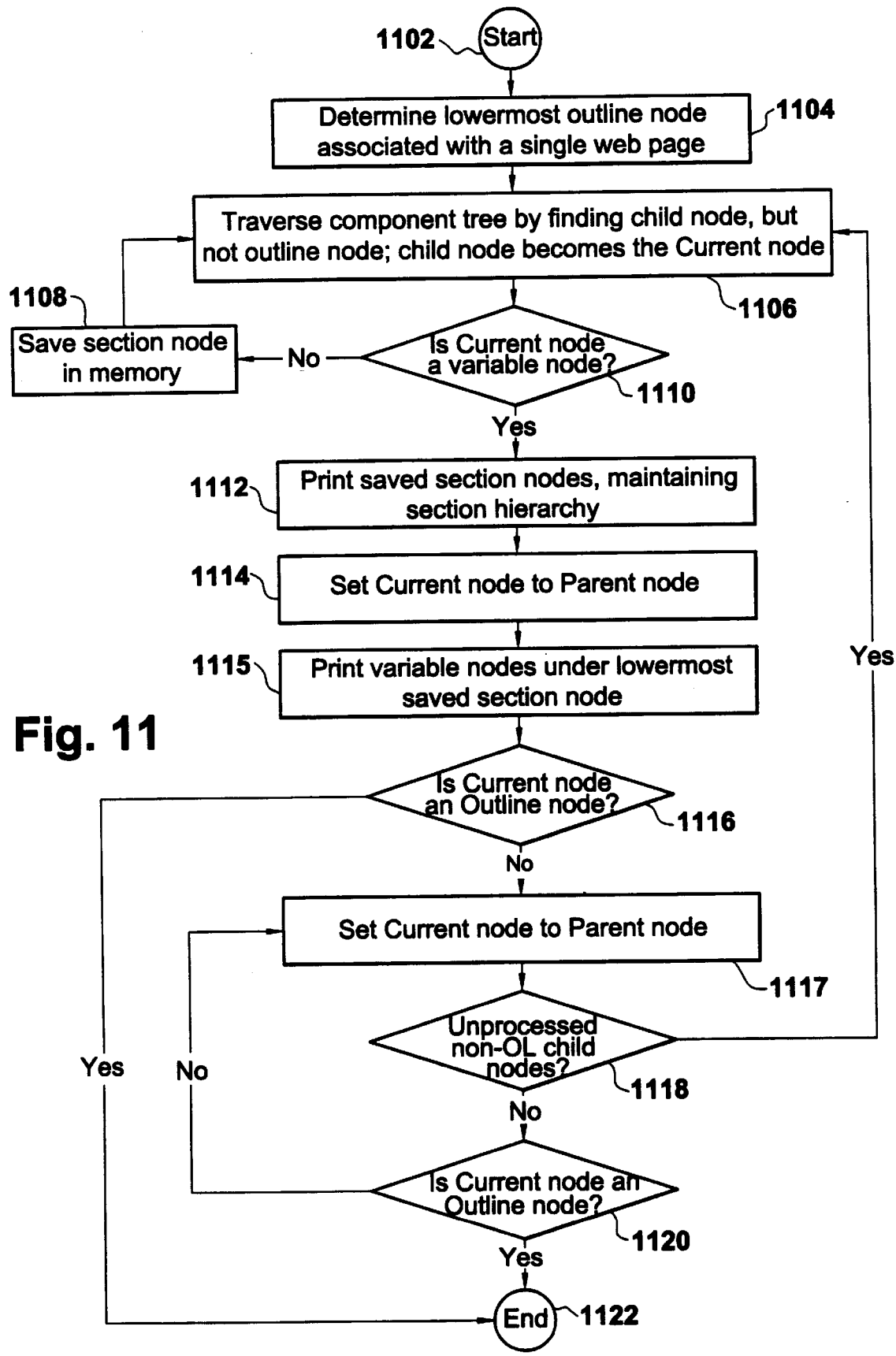
FIG. 11 is a flowchart depicting a process that can be used to generate web pages from a component tree, according to a preferred embodiment of the present invention.

FIG. 11 is a flowchart depicting an algorithm that can be used to generate any web page from any component tree in accordance with the present invention. As an example, portions of the web page 700 as generated from the component tree 400 is described with the flowchart in FIG. 11. However, before describing the details of this process, it is useful to highlight several distinct features of the component tree 400 according to a preferred embodiment of the present invention.

Preferably, a single web page that is ultimately presented to users during the spec entry phase 236, is represented in the component tree 400 as group of variable nodes that share a common parent that is the first parent outline node. For example, referring now to FIG. 4A, a single web page is represented by the Cover outline node 412, the child section nodes 420, 422 and 424 and the associated variable nodes 426–442. Note that the Cover outline node 412 is the first parent node of the variables 426–442 that is also an outline node. This is referred to herein as the "lowermost outline node." An example of a web page generated by this lineage is shown in FIGS. 7A & 7B.

Note that the other child nodes of the Cover outline node 412, namely the Artwork 444, Paper 446 and Ink nodes 448, are not parts of the single web page as described above. This is so because the Cover outline node 412 is not the lowermost outline node for the variable nodes associated with the Artwork 444, Paper 446 and Ink nodes 448.

In fact, in this example, the Artwork 444, Paper 446 and Ink nodes 448 themselves represent lowermost outline nodes for each of their corresponding child variable nodes. As such, the Artwork 444, Paper 446 and Ink nodes 448 each represent a separate web page. That is, the Artwork outline node 444 is the lowermost outline node for the variables 456–462. The Paper outline node 446 is the lowermost outline node for the variables 464–472. The Ink outline node 448 is the lowermost outline node for the variables 483–496. Examples of web pages that can be generated from the Art work 444, Paper 446 and Ink 448 lowermost outline nodes (and their descendants) are depicted in FIGS. 8, 9 and 10, respectively.

In sum, the lowermost outline node is defined as the first parent outline node of any set of variable nodes. This lineage defines a single web page generated by a preferred embodiment of the present invention. Thus, all of the variable nodes that share a lowermost outline node as their first parent outline node, appear on the same physical web page. It should be noted that in a preferred embodiment, web pages are constructed with a vertical scroll bar to allow for pages of arbitrary lengths. This feature greatly simplifies the process of formatting web pages, because the length of the web page is not a formatting issue.

Referring now to the flowchart in FIG. 11, a process that can be used to construct a web page from a component tree will now be described. The component tree 400 and the web page 700 will be used as examples during the description of this process.

The process begins with step 1102, where control immediately passes to step 1104. In step 1104, the process determines a lowermost outline node associated with a particular web page that is to be generated. In this example, it is assumed that the Cover 412 outline node is selected. This can occur, for example, if a user selects the cover navigation bar item 608, as shown in FIG. 6. For example, this would cause the web page associated with the navigation bar item 608 to be displayed.

It should be noted that generally, web pages are presented in any order in accordance with each specific implementation of the present invention. Typically, the industry expert specifies a particular order in which to present web pages and the component tree is built accordingly.

Once a lowermost outline node is identified, control passes to step 1106. In step 1106, the process traverses the component tree 400 by identifying the next child node that is not an outline node. In this example, the next child node that is not an outline node is the Sheet Spec node 420. This node becomes the current node.

Next, control passes to step 1110. In step 1110, the process determines if the current node (i.e. node 420) is a variable node. In this example, the current node is not a variable node, but a section node. Accordingly, control passes to step 1108, where a description of the Sheet Spec section node 420 is saved in memory. As described below, data related to the relative hierarchy of the Sheet Spec section node 420 is also maintained in memory. The hierarchy is used to present visual cues to the user for organizational purposes on the web page.

Next, step 1106 is again executed. This time, the current node becomes the variable node NP 426. Next, control passes to step 1110, where the process again determines if the current node is a variable node. This time, the current node is indeed a variable node, and control passes to step 1112.

In step 1112, the saved section node(s) are printed and displayed in accordance with their hierarchy from the component tree 400. In this example, there is only one saved section node, namely the Sheet Spec section node 420. However, it should be noted that in general, the loop represented by steps 1106–1110 may be executed an arbitrary number of times, yielding an arbitrary number of section nodes between the variable node(s) and the lowermost outline node. These section nodes typically represent sections and sub-sections of the web page. An example of a case having two section nodes between the variable nodes and the lowermost outline node is the Ink outline node 448.

It should also be noted that the current node may be identified as variable node the very first time step 1110 is executed. In this case, step 1108 is never executed. This occurs if there are zero section nodes between a lowermost outline node and the associated variable node(s). An example of a case having this property is the Paper node 446. Note that the paper node 446 is a lowermost outline node and that no other section nodes appear underneath it.

In step 1112, section nodes that are lower in hierarchy are typically printed in an indented fashion from their parent section nodes. In addition, certain formatting options can apply to specific hierarchies to aid in the visual organization of the spec. For example, a line drawn across a web page can be associated with specific hierarchies.

Thus, as a result of step 1112, the Sheet Specs section 710 is printed on the web page 700, as shown in FIGS. 7A & &B. This includes the line drawn across the web page. Next, control passes to step 1114. In step 1114, the current node is set to the parent node. In this example the current node becomes the Sheet Spec node 420. Next control passes to step 1115.

In step 115, all of the variable nodes (i.e. the children of the current node) are printed. In this example, the questions 718–722 corresponding to the variable nodes 426–430 are printed just under the Sheet Specs section 710.

Next, as indicated by step 1116, the process determines if the current node is an outline node. This can occur, for example, if there are no section nodes between the lowermost outline node and the variable nodes. An example of this condition is the Paper node 446. If in step 1116 the current node is an outline node (i.e. by definition, the lowermost outline node), the process is complete as indicated by step 1122.

However, using the present example, the current node is not an outline node. As such, control passes to step 1117. In step 117 the current node is set to the parent node. In this case, the parent node of the Sheet Spec node 420 is the namely the Cover node 412. Next, control passes to step 1118.

In step 1118, the process determines if there are any non-outline children nodes that have not been processed. If so, control passes to step 1106, where steps 1106–1117 are repeated. Accordingly, in this example, the Options node 422 and its descendants are processed next in the loop 1106–1117, in an identical fashion as described above with respect to the Sheet Spec node 420. This generates the options section header 712 and the associated variables 724–728 on the web page 700.

When the loop 1106–1117 is completed, step 1118 is then executed. This time the process determines that yet another unprocessed non-outline node exists, namely the Multiple Covers node 424. Thus, the loop 1106–1117 is again executed to generate the Multiple covers section header 714 and the associated variables 730–734 on the web page 700.

Finally, step 1118 is again executed. This time, the process determines that there are no additional unprocessed non-outline children of the Cover node 412. Accordingly, control passes to step 1120.

In step 1120, the process determines whether the current node is an outline node. In this example the current node is an outline node (i.e. the Cover outline node 412) and the process ends as indicated by step 1122.

If it is determined that the current node is not an outline node in step 1120, control could pass to step 1117, where the current node is set to the parent node. An example of this condition can be seen for the web page that would be generated from the Ink lowermost outline node 448. For example, in this case control would pass from step 1120 to step 1117 after the Side 1 section 474 node had been processed. Accordingly, the loop represented by steps 1117–1120 is executed when more than one section node lies between the variable nodes and the lowermost outline node of a web page.

After setting the current node to the parent node in step 1117, control passes to step 1118.

In step 1118, the process again determines if there are any other unprocessed non-outline nodes.

If so, the loop represented by steps 1106–1117 is repeated. If not, the loop represented by steps 1117 to 1120 are repeated, or the process may end, as indicated by step 1120. In any case, the process continues until step 1120 determines that the current node is the outline node, in which case, the process ends with step 1122.

Figure 12:
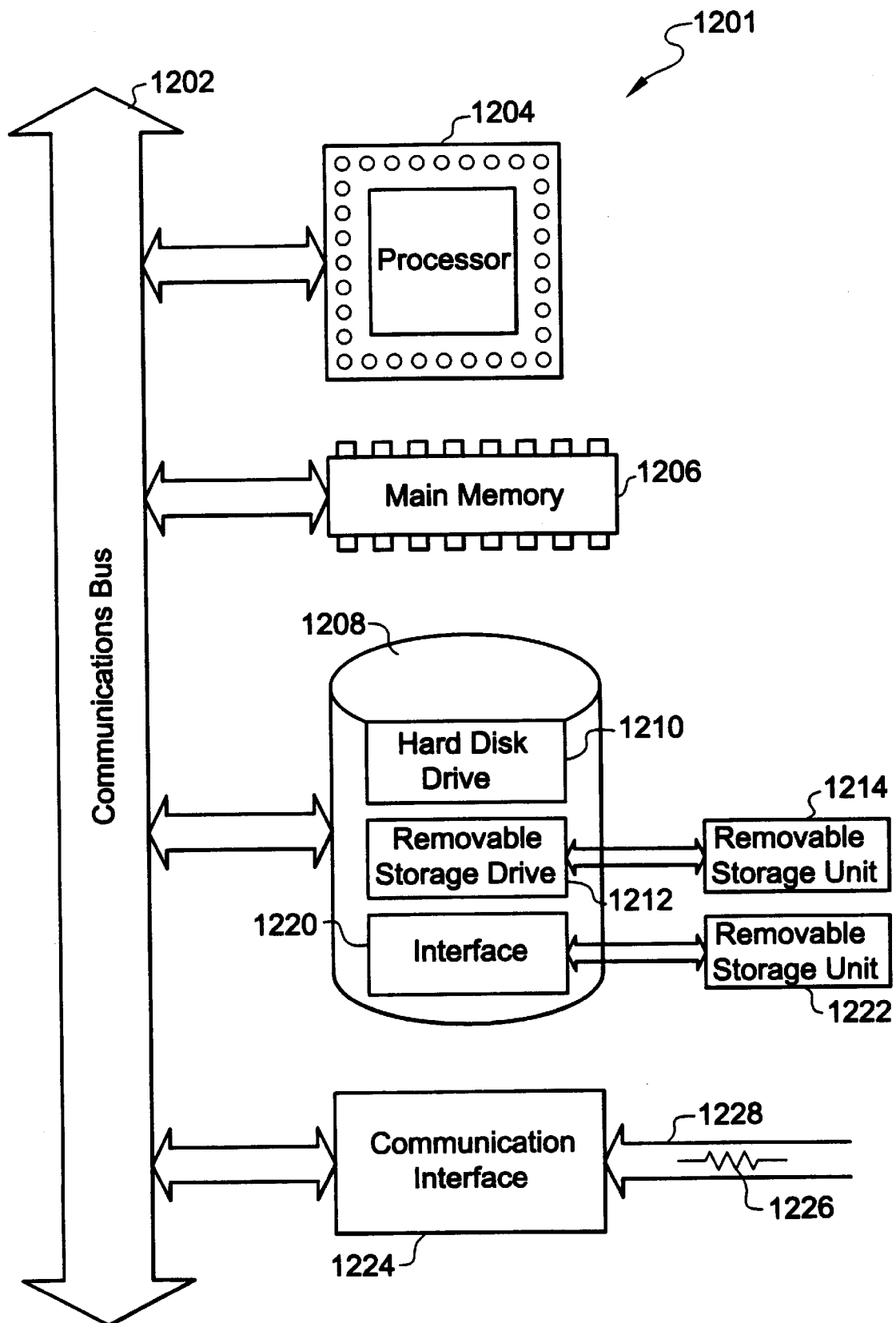
FIG. 12 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1201 is shown in FIG. 12. The computer system 1201 includes one or more processors, such as processor 1204. The processor 1204 is connected to a communication bus 1202. Various software embodiments are described in terms of this example computer system. After reading this description, it will become apparent to a person skilled in the relevant art how to implement the invention using other computer systems and/or computer architectures.

Computer system 1202 also includes a main memory 1206, preferably random access memory (RAM), and can also include a secondary memory 1208. The secondary memory 1208 can include, for example, a hard disk drive 1210 and/or a removable storage drive 1212, representing a floppy disk drive, a magnetic tape drive, an optical disk drive, etc. The removable storage drive 1212 reads from and/or writes to a removable storage unit 1214 in a well-known manner. Removable storage unit 1214, represents a floppy disk, magnetic tape, optical disk, etc. which is read by and written to by removable storage drive 1212. As will be appreciated, the removable storage unit 1214 includes a computer usable storage medium having stored therein computer software and/or data.

In alternative embodiments, secondary memory 1208 may include other similar means for allowing computer programs or other instructions to be loaded into computer system 1201. Such means can include, for example, a removable storage unit 1222 and an interface 1220. Examples of such can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1201.

Computer system 1201 can also include a communications interface 1224. Communications interface 1224 allows software and data to be transferred between computer system 1201 and external devices. Examples of communications interface 1224 can include a modem, a network interface (such as an Ethernet card), a communications port, a PCMCIA slot and card, etc. Software and data transferred via communications interface 1224 are in the form of signals which can be electronic, electromagnetic, optical or other signals capable of being received by communications interface 1224. These signals 1226 are provided to communications interface via a channel 1228. This channel 1228 carries signals 1226 and can be implemented using wire or cable, fiber optics, a phone line, a cellular phone link, an RF link and other communications channels.

In this document, the terms "computer program medium" and "computer usable medium" are used to generally refer to media such as removable storage device 1212, a hard disk installed in hard disk drive 1210, and signals 1226. These computer program products are means for providing software to computer system 1201

Computer programs (also called computer control logic) are stored in main memory and/or secondary memory 1208. Computer programs can also be received via communications interface 1224. Such computer programs, when executed, enable the computer system 1201 to perform the features of the present invention as discussed herein. In particular, the computer programs, when executed, enable the processor 1204 to perform the features of the present invention. Accordingly, such computer programs represent controllers of the computer system 1201.

In an embodiment where the invention is implemented using software, the software may be stored in a computer program product and loaded into computer system 1201 using removable storage drive 1212, hard drive 1210 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for creating, generating and processing a user-defined generic spec comprising the steps of:

creating a domain tree by defining a plurality of section nodes and variable nodes;

constructing a component tree by selecting one or more of said section nodes from said domain tree;

presenting a spec to a user comprising a plurality of spec pages constructed in accordance with said component tree;

processing said spec by receiving responses from said user; and storing said user responses in said data store to create a first completed spec.

2. The method of claim 1, wherein said presenting step further comprises the step of:

customizing said spec by dynamically altering one or more of said plurality of spec pages in accordance with said user responses.

3. The method of claim 2, wherein said step of creating a domain tree further comprises the step of creating a plurality of processing rules, each of said processing rules being associated with one or more of said variable nodes; and using said processing rules during said customizing step to determine when to alter said spec pages in accordance with said user responses.

4. The method of claim 1 wherein said step of creating a domain tree further comprises the steps of:

defining a plurality of questions, wherein each question is associated with one of said variable nodes;

specifying an answer type for each of said questions; and organizing said domain tree by placing variable nodes in a context by associating each of said variable nodes with at least one of said section nodes.

5. The method of claim 4, wherein said step of defining a plurality of questions comprises the steps of:

specifying a text definition for each of said plurality of questions, wherein said text definition includes a question prompt, a text length and text format.

6. The method of claim 4, wherein said step of specifying and answer type comprises the steps of:
defining a user interface control type associated with each of said variable nodes;
defining an acceptable data format for data entry field user interface controls; and
specifying a list of items to appear for list type user interface controls.

7. The method of claim 1, further comprising the step of:
defining a plurality of compatibility rules, each associated with predefined responses to said variable nodes; and
storing said plurality of compatibility rules in said data store.

8. The method of claim 7, further comprising the step of:
testing said first completed spec for compatibility with a second completed spec by comparing said first completed spec with said second completed spec in accordance with said compatibility rules.

9. The method of claim 1, wherein said step of creating a component tree further comprises the step of:
creating a component node for said component tree, said component node being the parent node of said one or more section nodes selected in said constructing step.

10. The method of claim 1, wherein said step of creating a domain tree further comprises the step of defining one or more of said section nodes as outline nodes.

11. The method of claim 10, wherein said presenting step includes presenting a navigation bar to the user for navigating between pages of said spec, said navigation bar comprising said outline nodes in said component tree, wherein said outline nodes are presented in accordance with a hierarchy defined by said component tree.

12. The method of claim 10, wherein said presenting step comprises the steps of:
determining a lowermost outline node in said component tree that is associated with a single spec page;
finding each non-outline child node of said lowermost outline node, until one or more child variable nodes are reached;
printing any found section nodes from said finding step, wherein any found section nodes are printed in accordance with a hierarchy associated with said found section nodes in said component tree; and
displaying said one or more child variable nodes on said single spec page.

13. The method of claim 12, further comprising the steps of:
traversing said component tree, one node at a time, in a direction toward said lowermost outline node; and
processing any remaining non-outline child nodes not processed by said finding step by repeating said finding, printing and displaying steps until said lowermost outline node is reached.

14. The method of claim 12, further comprising the step of:
means for enabling the computer to repeat said traversing, displaying and printing means, until all variable nodes associated with said lowermost outline node are processed by said printing means.

15. The method of claim 12, further comprising the step of:
repeating said traversing, displaying and printing steps, until all variable nodes associated with said lowermost outline nodes are printed by said printing step.

16. The method of claim 10, wherein said presenting step comprises the steps of:
determining a lowermost outline node of said component tree that is associated with a single spec page to be presented to the user;
traversing said component tree from said lowermost outline node, until one or more variable nodes are found;
displaying any section nodes that exist between said topmost outline node and said variable nodes on said single spec page, wherein said any section nodes are displayed in a hierarchical fashion in accordance with said component tree hierarchy; and
printing said variable nodes under a lowermost section node.

17. The method of claim 1, further comprising the step of:
defining a spec template comprising a list of one or more components.

18. The method of claim 17, wherein said list of one or more components includes at least one required component and one or more selectable components.

19. The method of claim 17, wherein said defining step further comprises the steps of:
defining a minimum and maximum value for each of said one or more components.

20. The method of claim 17, further comprising the step of:
dynamically creating a customized spec for a user by including said at least one required component and said one or more selectable components in accordance with user selections.

21. A centralized system delivered on a computer network, for creating, generating and processing generic user-defined specs, said system comprising:
a data store for storing a domain tree and one or more component trees;
a content editor coupled to said data base for creating and maintaining said domain tree and said one or more component trees;
a page builder coupled to said data store and the computer network, for creating specs that are presented to a user, each spec comprising one or more spec pages that are generated from one or more of said component trees;
a content reader coupled to said data store and said web browser for processing input data retrieved from the user; and
a rule processor coupled to said data store and said page builder for processing rules to dynamically customize the content of said spec pages in accordance with said processing rules and data retrieved from the user.

22. The system of claim 21, further comprising a cache builder, coupled to said data store and said page builder, for pre-processing at least a portion of said spec pages in advance of any user input.

23. The system of claim 21, further comprising a compatibility engine coupled to said data store for determining compatibility between two or more specs in accordance with a set of compatibility rules stored in said data store.

24. The system of claim 21, further comprising a template generator coupled to said data store for generating output in accordance with a set of output rules stored in said data store.

25. A computer program product comprising a computer useable medium having computer program logic stored therein, said computer program logic for enabling a computer to create, generate and process a generic user-defined spec, wherein said computer program logic comprises:

creation means for enabling the computer to create a domain tree by accepting definitions for a plurality of section nodes and variable nodes;

construction means for enabling the computer construct a component tree by accepting selective input data comprising one or more of said section nodes from said domain tree;

presenting means for enabling the computer to present a spec to a user comprising a plurality of spec pages that are constructed in accordance with said component tree;

processing means for enabling the computer to process said spec by retrieving responses from said user; and storing means for enabling the computer to store said user responses in said data store to create a first completed spec.

26. The computer program product of claim 25, wherein said presenting means further comprises:

customizing means for enabling the computer to customize said spec by dynamically altering one or more of said plurality of spec pages in accordance with said user responses.

27. The computer program product of claim 26, wherein said creation means further comprises means for enabling the computer to create a plurality of processing rules, each of said processing rules being associated with one or more of said variable nodes; and means for enabling the computer to user said processing rules by said customizing means to determine when to alter said spec pages in accordance with said user responses.

28. The computer program product of claim 25, wherein said creating means further comprises:

means for enabling the computer to accept a plurality of questions, wherein each question is associated with one of said variable nodes;

means for enabling the computer to associate an answer type for each of said questions; and means for enabling the computer to organize said domain tree by associating each of said variable nodes with at least one of said section nodes.

29. The computer program product of claim 28, wherein said means for enabling the computer to accept a plurality of questions, further comprises means for enabling the computer to store a text definition for each of said plurality of questions, wherein said text definition includes a question prompt, a text length and text format.

30. The computer program product of claim 28, wherein said means for enabling the computer to associate an answer type comprises:

means for enabling the computer to associate a user interface control type with each of said variable nodes;

means for enabling the computer to associate an acceptable data format definition for data entry field user interface controls; and means for enabling the computer to associate a list of items for list type user interface controls.

31. The computer program product of claim 25, wherein said computer program logic further comprises:

means for enabling the computer to accept a plurality of compatibility rules, wherein each said compatibility rule is associated with one or more predefined responses to said variable nodes; and means for enabling the computer to store said plurality of compatibility rules in said data store.

32. The computer program product of claim 31, further comprising:

means for enabling the computer to test said first completed spec for compatibility with a second completed spec by comparing said first completed spec with said second completed spec in accordance with said compatibility rules.

33. The computer program product of claim 25, wherein said creation means further comprises:

means for enabling the computer to create a component node for said component tree, said component node being the parent node of said one or more section nodes selected by said constructing means.

34. The computer program product of claim 25, wherein said creation means further comprises means for enabling the computer to define one or more of said section nodes as outline nodes.

35. The computer program product of claim 34, wherein said presenting means includes means for enabling the computer to present a navigation bar to the user for navigating between pages of said spec, said navigation bar comprising all of said outline nodes in said component tree, wherein said outline nodes are presented in accordance with a hierarchy defined by said component tree.

36. The computer program product of claim 34, wherein said presenting means comprises:

determining means for enabling the computer to determine a lowermost outline node in said component tree that is associated with a single spec page;

finding means for enabling the computer to find each non-outline child node of said lowermost outline node, until one or more child variable nodes are reached;

printing means for enabling the computer to print any found section nodes from said finding step, wherein any found section nodes are printed in accordance with a hierarchy associated with said found section nodes in said component tree; and displaying means for enabling the computer to display said one or more child variable nodes on said single spec page.

37. The computer program product method of claim 36, further comprising the steps of:

means for enabling the computer to traverse said component tree, one node at a time, in a direction toward said lowermost outline node; and means for enabling the computer to process any remaining non-outline child nodes not processed by said finding means by repeating said finding, printing and displaying means until said lowermost outline node is reached.

38. The computer program product of claim 18, wherein said presenting step comprises:

determining means for enabling the computer to determine a lowermost outline node of said component tree that is associated with a single spec page to be presented to the user;

traversing means for enabling the computer to traverse said component tree from said lowermost outline node, until one or more variable nodes are found;

displaying means for enabling the computer to display any section nodes that exist between said topmost outline node and said variable nodes on said single spec page, wherein said any section nodes are displayed in a hierarchical fashion in accordance with said component tree hierarchy; and printing means for enabling the computer to print said variable nodes under a lowermost section node.

39. A method for presenting a dynamically generated spec to a user, comprising the steps of:

creating a domain tree;

storing said domain tree in a data store;

creating a component tree from said domain tree;

creating a plurality of processing rules;

traversing said component tree to extract user prompts and variables therefrom;

building a first spec page comprising said user prompts and variables;

presenting said spec page to the user;

accepting user responses from the user;

updating said data store in accordance with said user responses;

constructing a second spec page in accordance with said responses and said processing rules; and presenting said second spec page to the user.

\* \* \* \* \*